US011747806B1

United States Patent
Wootton et al.

(10) Patent No.: US 11,747,806 B1
(45) Date of Patent: Sep. 5, 2023

(54) SYSTEMS FOR AND METHOD OF CONNECTING, CONTROLLING, AND COORDINATING MOVEMENTS OF AUTONOMOUS VEHICLES AND OTHER ACTORS

(71) Applicant: AV-Connect, Inc., Alameda, CA (US)

(72) Inventors: Bruce Wootton, Alameda, CA (US); Pravin Varaiya, Berkeley, CA (US); Jacopo Guanetti, Berkeley, CA (US)

(73) Assignee: AV-Connect, Inc., Alameda, CA (US)

( * ) Notice: Subject to any disclaimer, the term of this patent is extended or adjusted under 35 U.S.C. 154(b) by 494 days.

(21) Appl. No.: 16/421,321

(22) Filed: May 23, 2019

Related U.S. Application Data

(60) Provisional application No. 62/801,330, filed on Feb. 5, 2019.

(51) Int. Cl.
  G05D 1/00 (2006.01)
  G06T 7/20 (2017.01)
  (Continued)

(52) U.S. Cl.
  CPC ........... G05D 1/0088 (2013.01); B60W 10/04 (2013.01); B60W 10/18 (2013.01); B60W 30/18 (2013.01);
  (Continued)

(58) Field of Classification Search
  CPC .. G05D 1/0088; G05D 1/0231; G05D 1/0257; G05D 2201/0213; G06T 7/70;
  (Continued)

(56) References Cited

U.S. PATENT DOCUMENTS 7,920,969 B2   4/2011   Mudalige et al.
8,079,118 B2   12/2011  Gelvin et al.
(Continued)

FOREIGN PATENT DOCUMENTS

WO   WO2013163203 A1   10/2013
WO   WO2017192358 A1   11/2017

OTHER PUBLICATIONS

John. B. Kenney, "Dedicated Short-Range Communications (DSRC) Standards in the United States," Proceedings of the IEEE, 2011, pp. 1162-1182, vol. 99, No. 7, IEEE.
(Continued)

*Primary Examiner* — Tyler J Lee
*Assistant Examiner* — Tiffany P Ohman
(74) *Attorney, Agent, or Firm* — Haverstock & Owens A Law Corporation

(57) ABSTRACT

A method in accordance with the invention controls movements of an actor, such as an autonomous vehicle. The method includes collecting one or more data sets of location information from sources that include a first actor, a second actor, and a fixed agent. Each data set indicates a current location of an object from one or more objects. The method also includes merging the data sets to generate a second set of current location information of the one or more objects, filtering the second set of current location information to remove location information of static objects to generate a subset of the current locations corresponding to a subset of the objects, using the subset of current locations to predict future locations of the subset of objects, and coordinating the movement of the first actor based on the predicted future locations to optimize one or more pre-determined criteria.

38 Claims, 17 Drawing Sheets

(51) Int. Cl.
    *G05D 1/02*     (2020.01)
    *B60W 10/04*     (2006.01)
    *B60W 10/18*     (2012.01)
    *B60W 30/18*     (2012.01)
    *G08G 1/16*     (2006.01)
    *G06T 7/70*     (2017.01)

(52) U.S. Cl.
    CPC ......... *G05D 1/0231* (2013.01); *G05D 1/0257* (2013.01); *G06T 7/20* (2013.01); *G06T 7/70* (2017.01); *G08G 1/161* (2013.01); *G08G 1/164* (2013.01); *B60W 2554/00* (2020.02); *G05D 2201/0213* (2013.01); *G06T 2207/20076* (2013.01); *G06T 2207/20221* (2013.01); *G06T 2207/30236* (2013.01); *G06T 2207/30241* (2013.01); *G06T 2207/30252* (2013.01)

(58) Field of Classification Search
    CPC ............. G06T 7/20; G06T 2207/20076; G06T 2207/20221; G06T 2207/30236; G06T 2207/30241; G06T 2207/30252; B60W 10/04; B60W 10/18; B60W 30/18; B60W 2554/00; G08G 1/161; G08G 1/164
    See application file for complete search history.

(56) References Cited

U.S. PATENT DOCUMENTS

| | | |
|---|---|---|
| 8,229,663 B2 | 7/2012 | Zeng et al. |
| 8,280,583 B2 | 10/2012 | Stahlin et al. |
| 8,860,564 B2 | 10/2014 | Rubin et al. |
| 8,884,782 B2 | 11/2014 | Rubin et al. |
| 8,922,391 B2 | 12/2014 | Rubin et al. |
| 8,935,094 B2 | 1/2015 | Rubin et al. |
| 8,948,995 B2 | 2/2015 | Pandita et al. |
| 9,327,726 B2 | 5/2016 | Braunberger et al. |
| 9,371,002 B2 | 6/2016 | Braunberger |
| 9,449,515 B2 | 9/2016 | Rubin et al. |
| 9,460,625 B2 | 10/2016 | Wells |
| 9,521,575 B2 | 12/2016 | Bai |
| 9,552,727 B2 | 1/2017 | Rubin et al. |
| 9,632,485 B2 | 4/2017 | Braunberger |
| 9,632,507 B1 | 4/2017 | Korn |
| 9,830,821 B2 | 11/2017 | Braunberger et al. |
| 9,834,184 B2 | 12/2017 | Braunberger |
| 9,855,986 B2 | 1/2018 | Braunberger et al. |
| 9,868,385 B2 | 1/2018 | Braunberger |
| 9,878,693 B2 | 1/2018 | Braunberger |
| 10,956,723 B2 * | 3/2021 | Marty ................. G06V 20/42 |
| 2007/0083318 A1 | 4/2007 | Parikh |
| 2010/0188265 A1 | 7/2010 | Hill et al. |
| 2010/0214085 A1 | 8/2010 | Avery et al. |
| 2011/0106442 A1 | 5/2011 | Desai et al. |
| 2011/0238259 A1 | 9/2011 | Bai et al. |
| 2015/0124096 A1 | 5/2015 | Korvadi |
| 2016/0163200 A1 | 6/2016 | He et al. |
| 2016/0357187 A1 * | 12/2016 | Ansari ................. G01S 13/862 |
| 2019/0025841 A1 * | 1/2019 | Haynes ................. G01C 21/20 |
| 2019/0132709 A1 * | 5/2019 | Graefe ................. H04W 4/38 |
| 2019/0389459 A1 * | 12/2019 | Berntorp ................. G08G 1/167 |

OTHER PUBLICATIONS

Saif Al-Sultan et al., "A Comprehensive Survey on Vehicular Ad Hoc Network," Journal of Network and Computer Applications, 2014, pp. 380-392, vol. 37.

Xiang. Cheng et al., "5G-Enabled Cooperative Intelligent Vehicular (5GenCIV) Framework: When Benz meets Marconi", Cyber-Physical-Social Systems, IEEE Intelligent Systems, May/Jun. 2017, pp. 53-59, vol. 32, No. 3, IEEE Computer Society.

Philippe Xu et al., "System Architecture of a Driverless Electric Car in the Grand Cooperative Driving Challenge," IEEE Intelligent Transportation Systems Magazine, 2018, (26 pages) vol. 10, No. 1.

Justin M. Owens et al., "Reducing Conflict Between Vulnerable Road Users and Automated Vehicles," Road Vehicle Automation 4, 2018, pp. 69-75, Springer International Publishing AG.

Jacco van de Sluis et al., "Proposal for Extended Message Set for Supervised Automated Driving," European Commission, Seventh Framework Programme, Theme: ICT, FP7-ICT-2013-10, Interoperable GCDC Automation Experience, i-GAME D3.2, 2015 (52 pages).

Christos Katrakazas et al., "Real-Time Motion Planning Methods for Autonomous On-Road Driving: State-of-the-Art and Future Research Directions," Transportation Research Part C, Emerg. Technol., 2015, pp. 416-442, vol. 60, Elsevier Ltd.

Stephanie Lefevre et al., "Risk Assessment at Road Intersections: Comparing Intention and Expectation," Intelligent Vehicles Symposium, 2012, pp. 165-171, IEEE.

Zichao Huang et al., "An APF and MPC Combined Collaborative Driving Controller Using Vehicular Communication Technologies," Chaos, Solitons and Fractals, 2015, pp. 232-242, vol. 89.

Stefan K. Gehrig et al., "A Trajectory-Based Approach for the Lateral Control of Car Following Systems," IEEE International Conference on Systems, Man, and Cybernetics, 1998, pp. 3596-3601, IEEE.

Vehicle-To-Vehicle Communication Technology For Light Vehicles, Preliminary Regulatory Impact Analysis (Nov. 2016), pp. 1-375, Federal Motor Vehicle Safety Standard (FMVSS) No. 150, U.S. Department of Transportation, National Highway Traffic Safety Administration, Office of Regulatory Analysis and Evaluation, National Center for Statistics and Analysis.

Matthias Roeckl et al., "Sensing the Environment for Future Driver Assistance Combining Autonomous and Cooperative Appliances," Proceedings, Institute of Communications and Navigation, Institute of Transportation Systems, German Aerospace Center (DLR), 2008, pp. 45-56, Germany.

Florian Ahlers et al., "Cooperative Laserscanner Pre-Data-Fusion," 2008 IEEE Intelligent Vehicles Symposium, 2008, pp. 1187-1190, IEEE, The Netherlands.

Seong-Woo Kim et al., "Cooperative Perception for Autonomous Vehicle Control on the Road: Motivation and Experimental Results," 2013 IEEE/RSJ International Conference on Intelligent Robots and Systems (IROS), 2013, pp. 5059-5066, Tokyo, Japan.

Andreas Rauch et al., "Car2X-Based Perception in a High-Level Fusion Architecture for Cooperative Perception Systems," 2012 Intelligent Vehicles Symposium, 2012, pp. 270-275, IEEE, USA.

Andreas Rauch et al., "Inter-Vehicle Object Association for Cooperative Perception Systems," Proceedings of the 16th International IEEE Annual Conference on Intelligent Transportation Systems (ITSC 2013), 2013, pp. 893-898, IEEE, The Netherlands.

Moreno Ambrosin et al., "Object-Level Perception Sharing Among Connected Vehicles," 2019 IEEE Intelligent Transportation Systems Conference (ITSC), 2019, pp. 1566-1573, IEEE, Auckland, New Zealand.

F. Seeliger et al., "Advisory Warnings Based on Cooperative Perception," 2014 IEEE Intelligent Vehicles Symposium Proceedings, 2014, pp. 246-252, IEEE.

Dietrich Franken et al., "Improved Fast Covariance Intersection for Distributed Data Fusion," 2005 7th International Conference on Information Fusion (FUSION), 2005, pp. 154-160, vol. 1, IEEE.

Fabian De Ponte Muller et al., "Cooperative Positioning and Radar Sensor Fusion for Relative Localization of Vehicles," 2016 IEEE Intelligent Vehicles Symposium (IV), 2016, pp. 1060-1065, IEEE, Gothenburg, Sweden.

Stanley W. Smith et al., "Balancing Safety and Traffic Throughput in Cooperative Vehicle Platooning," 2019 European Control Conference, 2019 (6 pages).

Mogens Graf Plessen et al., "Multi-automated Vehicle Coordination Using Decoupled Prioritized Path Planning for Multi-Lane One- and Bi-Directional Traffic Flow Control," 2016 IEEE 55th Conference on Decision and Control (CDC), 2016, pp. 1582-1588, Las Vegas, Nevada, USA.

Mogens Graf Plessen et al., "Spatial-Based Predictive Control and Geometric Corridor Planning for Adaptive Cruise Control Coupled with Obstacle Avoidance," IEEE Transactions on Control Systems Technology, 2018, pp. 38-50, vol. 26, No. 1.

(56) References Cited

OTHER PUBLICATIONS

Xiaotong Shen et al., "Multi-Vehicle Motion Coordination Using V2V Communication," 2015 IEEE Intelligent Vehicles Symposium (IV), 2015, pp. 1334-1341, Seoul, Korea.
"Dedicated Short Range Communication (DSRC) Systems Engineering Process Guidance for SAE J2945/X Documents and Common Design Concepts(TM)," Surface Vehicle Standard, Dec. 2017, pp. 1-81, SAE International.

* cited by examiner

SYSTEMS FOR AND METHOD OF CONNECTING, CONTROLLING, AND COORDINATING MOVEMENTS OF AUTONOMOUS VEHICLES AND OTHER ACTORS

RELATED APPLICATION(S)

This application claims priority under 35 U.S.C. § 119(e) of the U.S. provisional patent application Ser. No. 62/801,330, titled "SYSTEMS FOR AND METHODS OF CONNECTING AND COORDINATING MOVEMENTS OF AUTONOMOUS VEHICLES AND OTHER OBJECTS," filed Feb. 5, 2019, which is hereby incorporated by reference in its entirety.

FIELD OF THE INVENTION

This invention is related to controlling and coordinating the movement of vehicles, robots, or other objects. More particularly, this invention is related to controlling and coordinating the movements of autonomous vehicles or robots so that traffic moves in a safe and efficient manner.

BACKGROUND OF THE INVENTION

Autonomous vehicles determine location and other information using on-board sensors, GPS, and other remote systems. The location information is often incomplete or inaccurate. For example, the autonomous vehicle cannot determine the location of mobile objects that are obscured from view. These vehicles also cannot predict the movements of other objects in the area, such as cars, pedestrians, bicyclists, emergency vehicles, trucks, buses, skaters, animals, or toys such as balls in the immediate vicinity, especially in dangerous locations such as intersections, around blind corners, or in moving traffic. The lack of information about objects in the vicinity and where they might move increases the risk of collisions, impedes traffic flow, and increases energy consumption.

Thus, there is a need for more accurately predicting movements of vehicles, pedestrians, and other objects, to allow vehicles, robots, and other objects to operate more safely and efficiently.

BRIEF SUMMARY OF THE INVENTION

In accordance with the principles of the invention, the movements of autonomous vehicles (AVs) are controlled and coordinated by allowing them to exchange information to predict future locations of vehicle, pedestrian, and other non-motorized traffic. For purposes of this disclosure, a vehicle configured in accordance with the present invention is called an "actor." The term "agents" refers to actors, cameras, and other components, whether fixed or mobile, used to capture images and location information to determine the locations of objects ("targets") in and around a specific area. The term "mixed agents" refers to a combination of mobile and fixed agents.

In accordance with the principles of the invention, actors merge their different views of an area containing objects to generate a whole, more complete, general real-time view of the area and its traffic, such as at an intersection or along a roadway. As used herein, this view is called a WideSense™ view (WideSense™ is a trademark of AV-Connect, Inc., of Alameda, California, USA) or a "merge environment view" and can include vehicles, pedestrians, non-motorized objects, and static objects (not including stopped vehicles). In one embodiment, an actor uses this merged view, along with historical data and predictive models to predict the future locations of objects in the view. As one example, a predictive model mixes physics-based principles (such as a maximum walking speed of pedestrians) with historical data at an intersection, based on criteria such as the history of traffic in the intersection and nearby street corners on particular days, at particular times of day and year, to name only a few variables. The forecasted motion is used to coordinate traffic to reduce collisions in the intersection. In other environments, the predicted motion is used to allow for smooth merging into lanes and the efficient use of AV eco-systems, to name only a few possible advantages.

In a first aspect of the invention a method of controlling movements of an actor includes collecting one or more sets of location information from sources comprising a first actor, a second actor, and a fixed sensor, each set indicating a current location of an object from one or more objects; fusing the data sets to generate a second set of current location information of the one or more objects; filtering the second set of current location information to remove location information of any static objects to generate a subset of the current location information for a subset of the one or more objects; using the subset of current location information to predict future locations of the subset of the one or more objects; and controlling movements of the first actor based on the predicted future locations to optimize one or more pre-determined criteria.

Preferably, the fusing includes filtering non-relevant information from the second set of current location information. In one embodiment, the movements include merging into an intersection, merging into moving traffic, or merging into a platoon of moving vehicles.

Preferably, the first actor is an autonomous vehicle. Alternatively, the first actor is a robot or a mobile phone.

In one embodiment, the autonomous vehicle includes a camera, a radar, a processor, and a communication element for communicating with the sources. In one embodiment, the processor is a multi-core processor having multiple cores, wherein each of the multiple cores processes location information in parallel with the other cores.

In one embodiment, the subset of objects includes a non-autonomous vehicle, a non-motorized vehicle, a pedestrian, a cyclist, or any combination thereof.

Preferably, the one or more pre-determined criteria include collision avoidance, merging based on merge restrictions, decreased total energy consumption of the first actor over a pre-determined time or distance, reduced traffic density in a pre-determined region, or any combination thereof. The merge restrictions include acceleration or deceleration within a predetermined range.

Preferably, predicting a future location of the one or more objects is based on historical movements of objects within a scene, such as a fixed location or a location relative to one or more moving objects.

In one embodiment, each of the future predicted locations is based on probability trajectories. Each of the probability trajectories includes a safe set that ensures collision avoidance. In one embodiment, each of the safe sets has an acknowledgment window during which the first actor must receive communications from a pre-determined set of actors. Preferably, the method also includes the first actor taking an evasive maneuver, such as an abort, when the first actor does not receive the communication within the acknowledgment window.

Preferably, each of the safe sets has parameters based on a motion of a corresponding actor and a scene containing the actors. Each of the safe sets forms a geometric or a non-geometric shape.

Preferably, the first actor wirelessly communicates directly with the second actor. Alternatively, the first actor wirelessly communicates with the second actor over a cloud network.

In one embodiment, the first actor and the second actor exchange prediction information indicating the probability trajectories of objects within a scene.

The location information includes x-y coordinates or angular coordinates.

In a second aspect, a method of coordinating movement among a group of actors includes determining a coordinated maneuver for the group of actors; selecting a leader from the group of actors; selecting a safe zone for each of the actors in the group of actors; exchanging information among members of the group of actors to coordinate the movement; ensuring that the movement satisfies criteria of each of the safe zones; and executing the coordinated movement. In one embodiment, the movement includes merging one of the actors from the group of actors between two other actors from the group of actors. Preferably, the method also includes executing an evasive maneuver when any one or more of the criteria are not satisfied or the leader does not receive a safe zone acknowledgment from all the other actors within a pre-determined window.

In a third aspect, a system for controlling movements of an actor includes a sensor for collecting data to generate a first actor list associating one or more actors with current location information; a vehicle-to-vehicle information module configured to exchange location information about the actor and the first actor list with peer actors; a merge module for merging the first actor list and second actor lists received from peer actors to generate a merged actor list; an actor predictor module for predicting future locations of actors in the merged actor list; and a deployment module for deploying movement commands on the system for controlling movement of the actor based on movement criteria. In one embodiment, the merge module performs the steps converting lists into a group of lists with a common reference frame; calculating a closest plausible overlap between shared list items; and calculating an uncertainty of the merged lists by combining uncertainty in the original lists and errors in matched entries. In one embodiment, the deployment module transmits the movement commands to a planning, driver assist, or navigation system on the actor. Preferably, the movement criteria include collision avoidance, efficient merging in moving traffic, and energy efficiency according to predetermine criteria.

In one embodiment, the system also includes an actor validator configured to evaluate a next step behavior of each actor in the list of actors with a corresponding current observed behavior from sensors local to the first actor.

In a fourth aspect, a network for coordinating the movements of one or more actors includes a first actor configured to receive and process location data of objects from one or more second actors and one or more fixed agents, and to process the location data to predict future movements of the objects within a scene; and a fixed agent. The fixed agent captures historical data of object movements within the scene to generate probability trajectories for the objects within the scene. In one embodiment, the one or more fixed agents capture object movements near an intersection. In another embodiment, the one or more fixed agents span a roadway and capture object movements along the roadway.

Preferably, the system also includes an artificial intelligence module for making inferences of object movements and providing optimized decisions for controlling movements of the first actor.

As explained in more detail below, embodiments of the invention can be used in a variety of applications, including autonomous vehicles, driver-assist systems for safety or eco-drive, port vehicles, autonomous robots, autonomous mobile platforms, mixed-mode environments, and human-vehicle communications, to name only a few such applications and environments.

BRIEF DESCRIPTION OF THE SEVERAL VIEWS OF THE DRAWINGS

The following figures are used to illustrate embodiments of the invention. In all the figures, the same label refers to the identical or a similar element.

DETAILED DESCRIPTION OF THE INVENTION

In accordance with the principles of the invention, actors, such as autonomous vehicles, are moved in a coordinated manner by forecasting the locations of objects in their paths. By predicting object trajectories, vehicles can move more safely, reducing collisions, energy consumption, or both, to name only a few possible advantages.

Preferably, movements in accordance with the principles of the invention are based on the type of actor. For example, AVs can be fully controlled. Drivers of human-driven vehicles can receive recommended moves, such as recommendations to change lanes or to slow down to a particular speed, to name only a few examples. Vehicles with driver-assisted systems can receive commands to change a vehicle's trajectory, such as by using adaptive cruise control or lane-changing assists.

Systems in accordance with the principles of the invention have other advantages. For example, in a system containing three actors (here, AVs), a first AV can indicate that it wishes to merge between the two AVs. The two other AVs adjust their speeds to open up a space between them, allowing the first AV to smoothly and seamlessly merge into the opened space. Or, using prediction information, the first AV can learn that downstream traffic is slow, and automatically reduce its power train output, thereby saving energy.

It will be appreciated that embodiments of the invention are particularly useful at locations that lack lane markings, have split phases that make it difficult to determine who has the right of way, invisible vehicle approaches, illegal movements, intersections with unprotected left turns, and simultaneous interactions among pedestrians, bicycles, and vehicles.

While some of the examples below describe predictions made on vehicles, it will be appreciated that predictions can be alternatively be made at a remote location, such as over a cloud network, and communicated to the vehicles.

Figure 1:
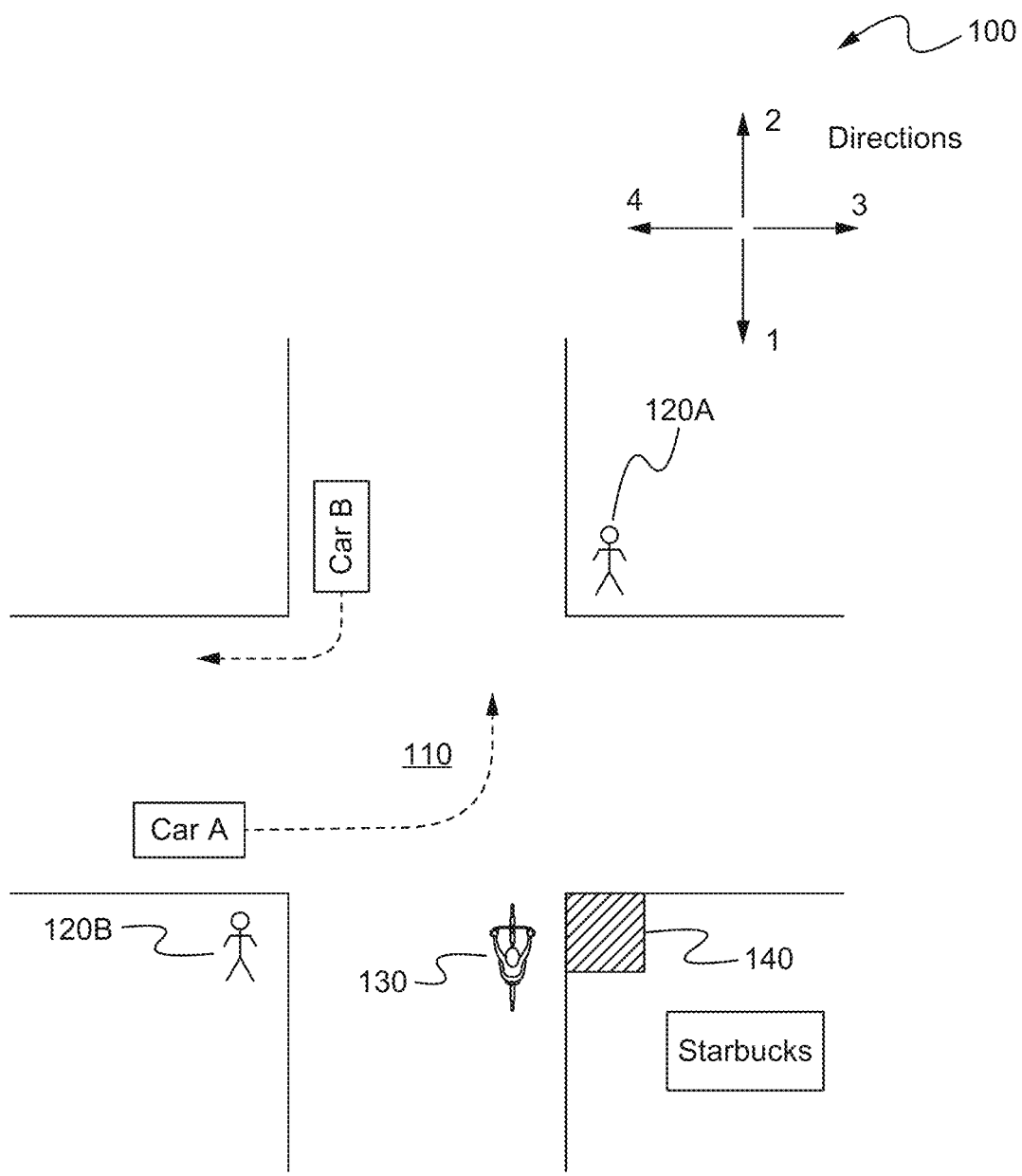
FIG. 1 is a high-level diagram showing how car movements are coordinated at an intersection in accordance with one embodiment of the invention.

FIG. 1 illustrates an environment 100 in which the movements of two cars A and B at intersection 110 are coordinated in accordance with the principles of the invention. The environment 100 includes the intersection 110, car A, car B, pedestrians 120A and 120B, bicyclist 130, and street sensor 140. Typically, environments will include more objects than shown in FIG. 1. The number of objects is reduced to simplify the discussion. For ease of reference, car A, car B, and the street sensor 140 are referred to as components of a coordinating network. In this embodiment, car A, car B, and the street sensor 140 each collects data about current locations of objects in and around the intersection 110, shares this data among themselves, and processes the data to determine paths (trajectories) for the cars A and B to travel safely through the intersection 110, without collision. Because the cars A and B are mobile and the street sensor 140 is fixed, all of which collect and process location data, the coordinating network is said to use mixed agents.

In this example, cars A and B arrive at the intersection 110, which has no stop light. Based on the shared information, car A determines the locations of car B, pedestrians 120A and 120B, and bicyclist 130. Using these data, the historical predictive model for the intersection, and the prediction criteria, car A determines that car B will go in direction 4 with a 70% probability, go in direction 1 with a 10% probability, and go in direction 3 with a 20% probability. Similarly, car A predicts that pedestrian 120A will walk in direction 1 with an 80% probability, pedestrian 120B will walk in direction 3 with a 95% probability, and bicyclist 130 will cycle in direction 2 with an 80% probability. Based on these predictions, car A will move to prepare for the left turn and will initiate the turn as soon as it makes positive confirmation of its intention.

In this example, car A determines the probability trajectories of pedestrians 120A and 120B and bicyclist 130 using historical data based on the input criteria. As one example, the input criteria are the time of year (e.g., January 2), the day of the week (e.g., Monday, a non-holiday), and the hour (12:00 p.m.). At this location (across the street from a Starbucks® coffee shop) for these criteria, in the past, 80% of the time a pedestrian at the location of the pedestrian 120A crosses the street, in direction 1, to visit the Starbucks® coffee shop.

It will be appreciated that in this example, car A does not have to predict the trajectory of car B since the cars communicate with each other. In other scenarios, car B is not part of a coordinating network and does not communicate with car A. In these other scenarios, car A predicts the trajectory of car B and uses this prediction to coordinate its movement.

It will be appreciated that probabilities can be determined using many methods, such as normal distributions, Gaussian distributions, or any methods known to those skilled in the art.

Figure 2:
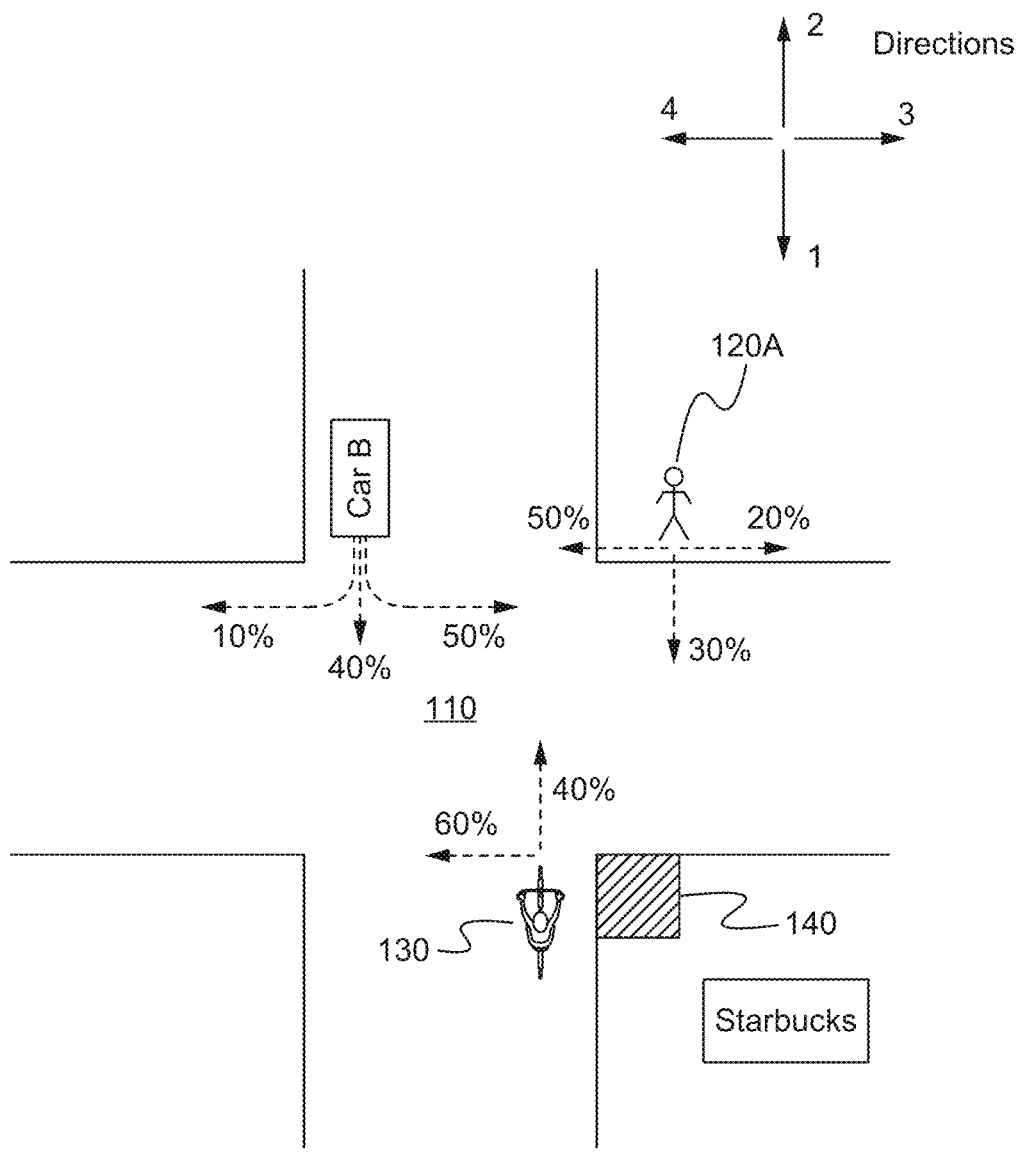
FIG. 2 shows probability trajectories for objects of FIG. 1, based on different criteria.

FIG. 2 shows trajectories for car B, pedestrians 120A, and bicyclist 130 in the environment with other criteria. Here, car B is not part of a coordinating network. In this context, Saturday at 3:30 pm, car B's probability trajectories include a first probability trajectory indicating (having) a 10% probability of car B turning in direction (along trajectory) 4, a second probability trajectory indicating a 40% probability of car B going in direction 1, and a third probability trajectory indicating a 50% probability of car B going in direction 3. The probability trajectories for the pedestrian 120A indicate, respectively, a 50% probability of pedestrian 120A walking in direction 4, a 30% probability of pedestrian 120A walking in direction 1, and a 20% probability of pedestrian 120A walking in direction 3. Finally, the probability trajectories for the bicyclist 130 indicate, respectively, a 60% probability of bicyclist 130 going in direction 4 and a 40% probability of bicyclist 130 going in direction 2.

It will be appreciated that the components of a coordinating network receive and process a large of amount of location data. Preferably, the location data are filtered to remove non-essential data, such as location information of static objects or other objects that either do not move or rarely move and thus are unlikely to collide with a car, objects such as parked cars, buildings, trees, mailboxes, etc. The locations of these objects do not have to be accounted for. Filtering their location data reduces the amount of information that must be stored, processed, transmitted, and used to prediction movements, thereby reducing the processing load on the system and thus the time needed to generate predictions.

Figure 3:
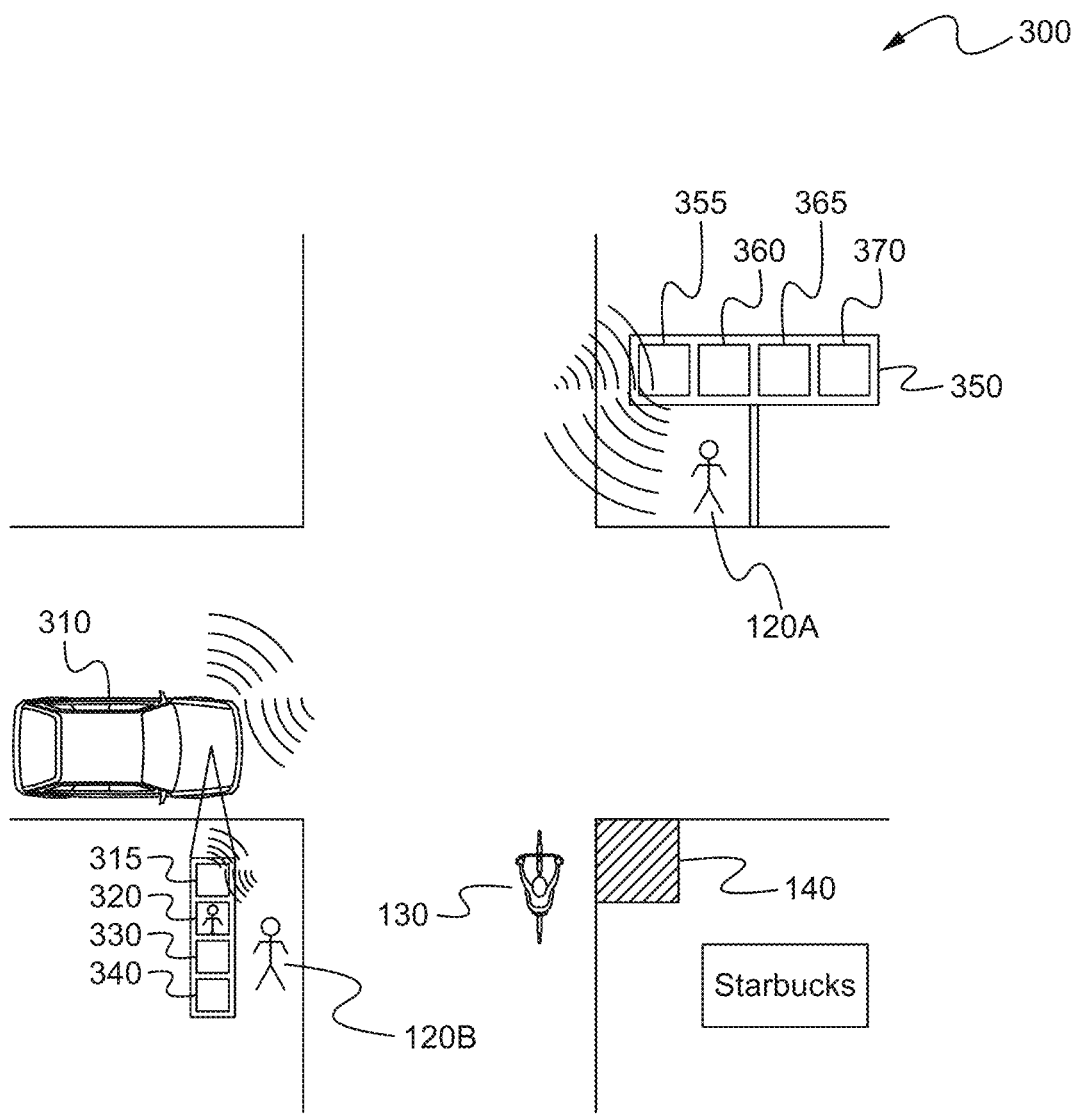
FIG. 3 shows a car and a corner sensor configured to communicate with each other and process location data in accordance with one embodiment of the invention.

FIG. 3 shows an AV 310 and an intelligent traffic sensor 350 in accordance with one embodiment of the invention. The AV 310 includes a radar 315, a camera 320, a processor 330, and a communication element 340. The sensor 350 includes a radar 355, a camera 360, a processor 365, and a communication element 370. Each of the communication elements 340 and 370 can include a radio, a 5G or other network, or a modem, to name only a few possibilities. In operation, the radar 315 detects targets and the camera 320 captures images of the objects in the vicinity of the AV 310. The processor 320 processes the images of objects in the vicinity (referred to as the scene) from the viewpoint of the AV 310 and generates, for example, (X,Y) coordinates of targets, such as pedestrians 120A and 120B, and the bicyclist 130. The communication element 340 communicates this data to similarly equipped vehicles in the vicinity. In a similar manner, the sensor 350 uses its radar 355, camera 360, and processor 365 to capture and process similar location data from its viewpoint, and communicates this data using the communication element 370. The AV 310 thus receives scenes of the area from its own radar 315 and camera 320, from similar elements on the sensor 350, and possibly from other actors in the vicinity. As described in more detail below, the AV 310 merges these scenes of the environment to get a more general and complete view of the vicinity.

It will be appreciated, that in some instances the sensor 350 can capture images and process location data for objects that the AV 310 cannot "see," that is objects that are obscured from AV 310 or otherwise outside its field of vision.

Figure 4:
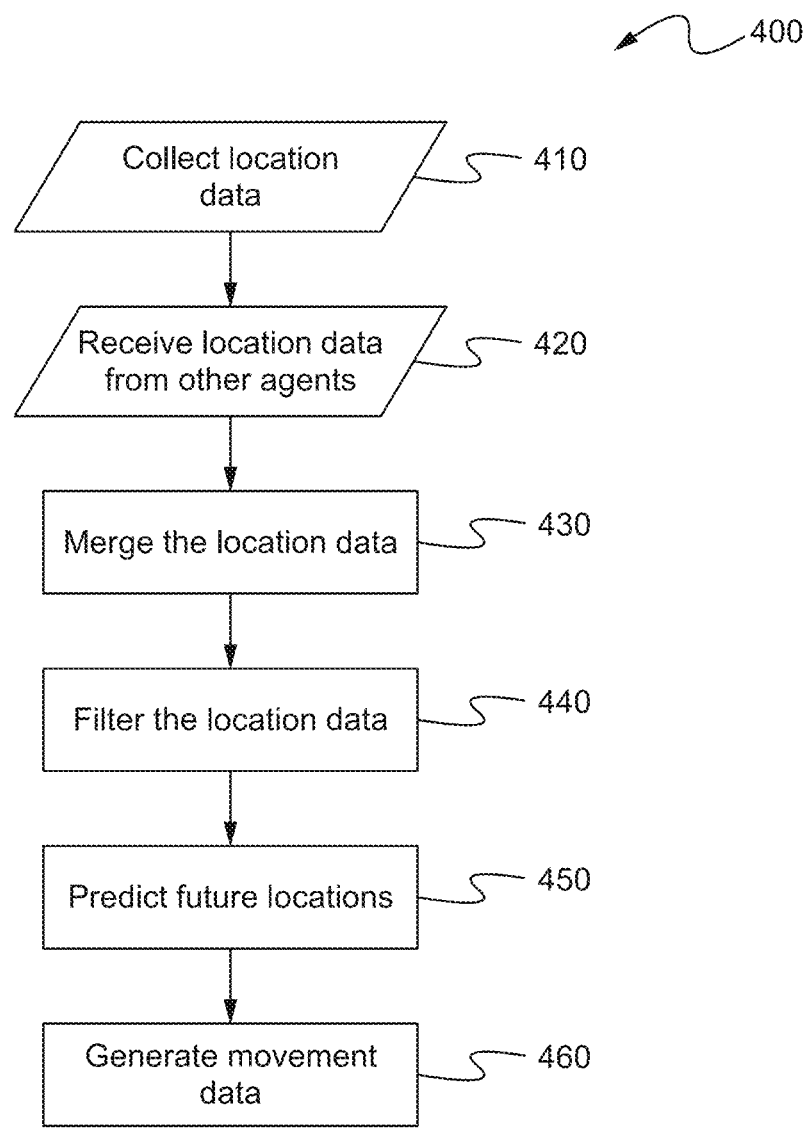
FIG. 4 shows the steps of a process for coordinating movements of autonomous vehicles in accordance with one embodiment of the invention.

FIG. 4 is a high-level diagram of the steps of a process 400 for coordinating the movements on a vehicle, such as an AV, in accordance with one embodiment of the invention. In the step 410, the vehicle collects location data for the targets in an area of interest, such as an intersection or a space between moving vehicles on a highway. In this step only relevant data are kept. For example, data outside an area of interest (e.g., 20 meters from an intersection) are ignored. Next, in the step 420, the vehicle receives location data about targets in the area of interest from other actors on its coordinating network. Next, in the step 430, the location data received in the steps 410 and 420 are merged into fused location data. Next, in the step 440, the vehicle filters the fused location data to determine only the data relevant for its decision, such as by deleting information about static objects. Next, in the step 450, the vehicle uses a predictive model to predict the future locations of the objects of interest. Finally, in the step 460, the vehicle generates movement commands to coordinate its movement based on these predicted trajectories.

Preferably, the movements are based on a map, context, and the location data. As one example, a movement is to merge car A into a lane between two moving cars, car B followed by car C. The context is that the cars are traveling during rush hour 1 mile from a busy exit. Car B is traveling the speed limit and car C is traveling 10 miles below the speed limit. Based on these criteria, the probability trajectories for car B indicate, respectively, a 70% probability that it will keep in its lane and decelerate to exit, a 10% probability that it merges into its immediate left lane and maintains its speed, and 20% probability it keeps in its lane and accelerates. The probability trajectories for car C indicate, respectively, a 60% probability that it keeps in its lane and maintains its speed to exit, a 5% probability that it keeps in its lane and accelerates, and a 35% probability that it keeps in its lane and decelerates. Using these trajectory predictions, car A can determine when and whether to merge. When cars A, B, and C are actors, their movements can be coordinated to ensure a smooth and seamless merge.

It will be appreciated that a vehicle changes coordinating networks when it travels to different locations with different areas of interest or travels along different sections of a highway, to name a few examples, and thus communicates with different actors.

Actors

According to the principles of the invention, some vehicles are configured as actor AVs, in accordance with the invention, and others as "peer" vehicles, which generate suggestions or warnings, as described below.

Figure 5A:
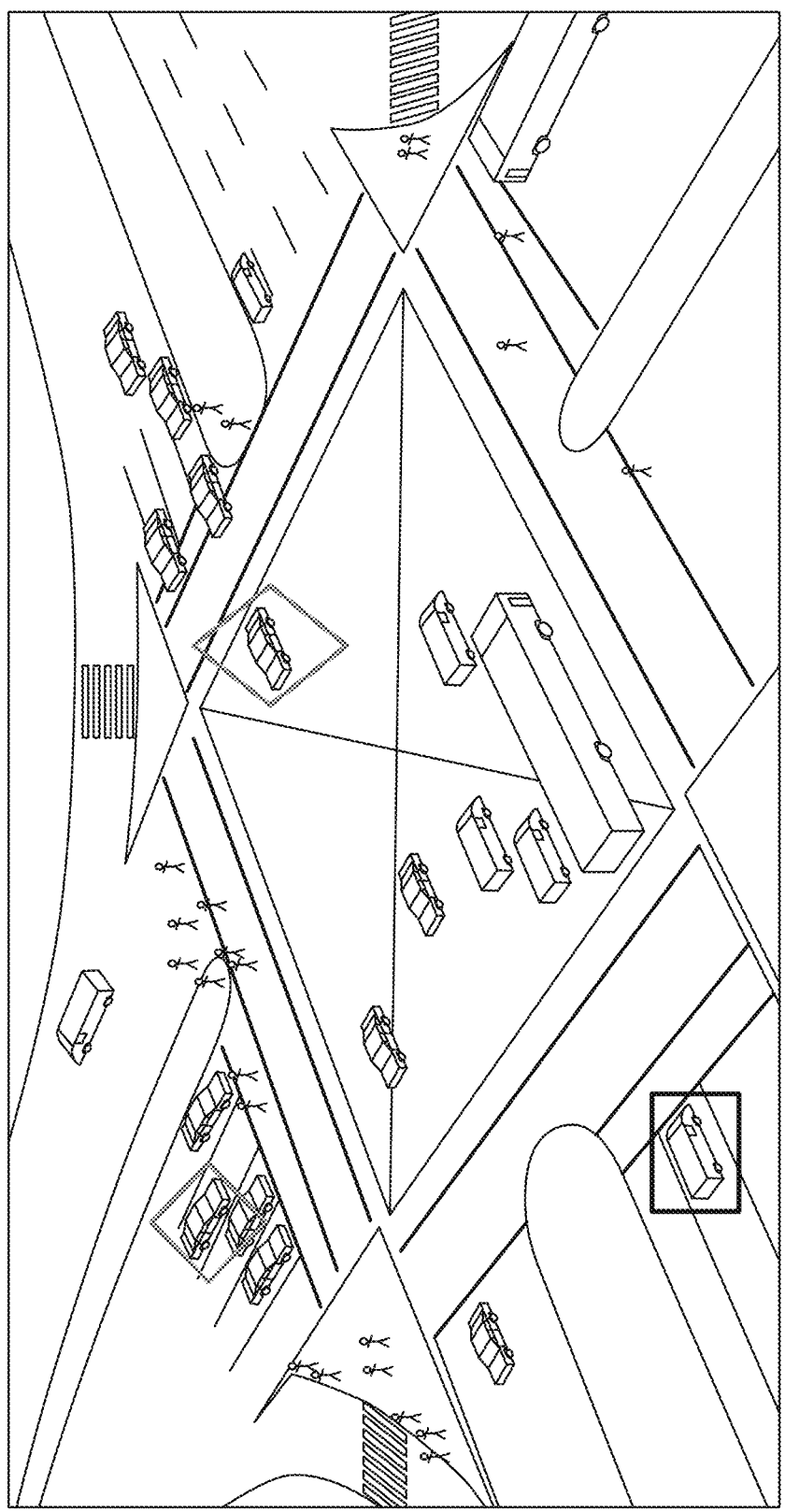
FIGS. 5A-C show actors and peers in an intersection to illustrate the principles of the invention.
Figure 5B:
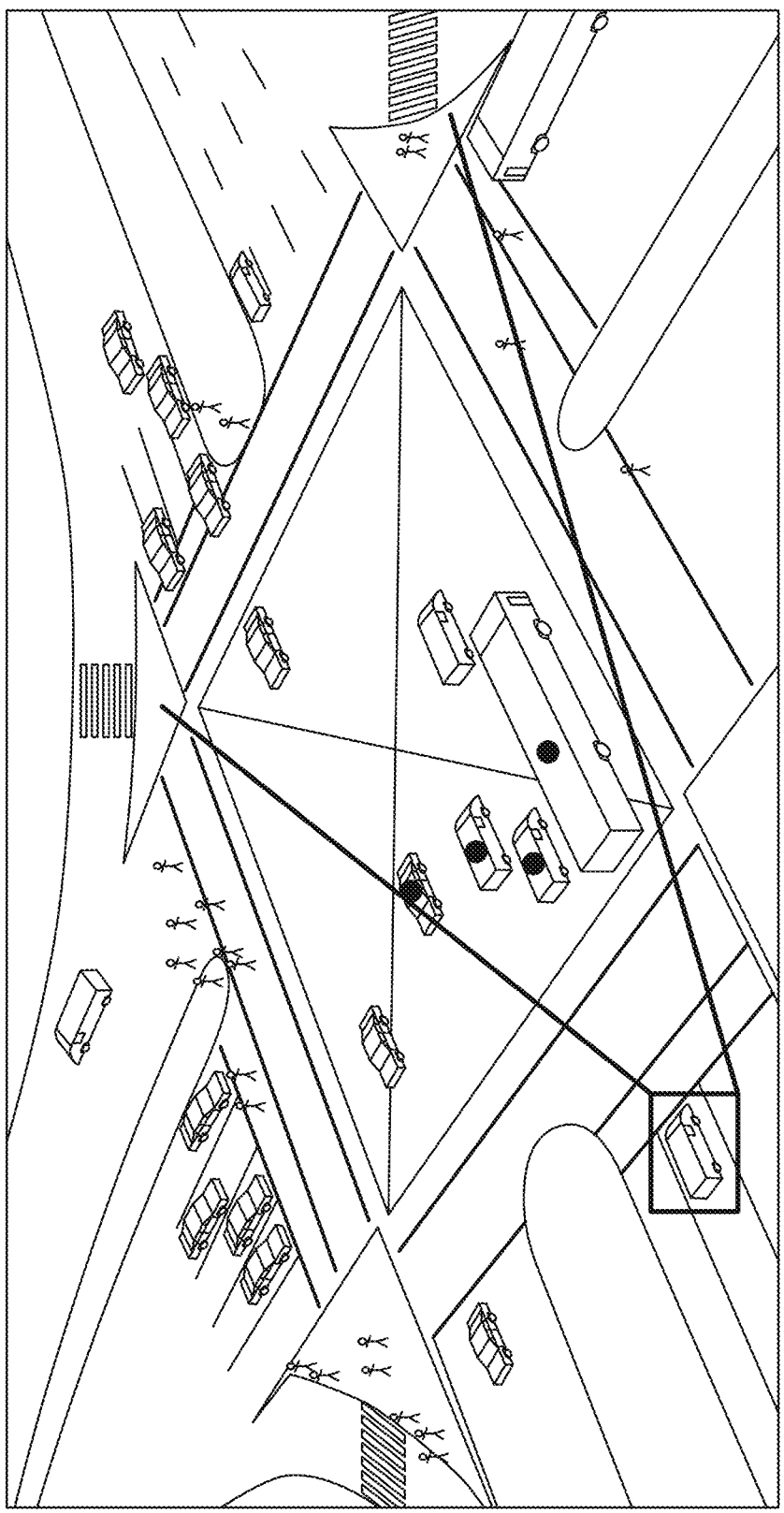
Figure 5C:
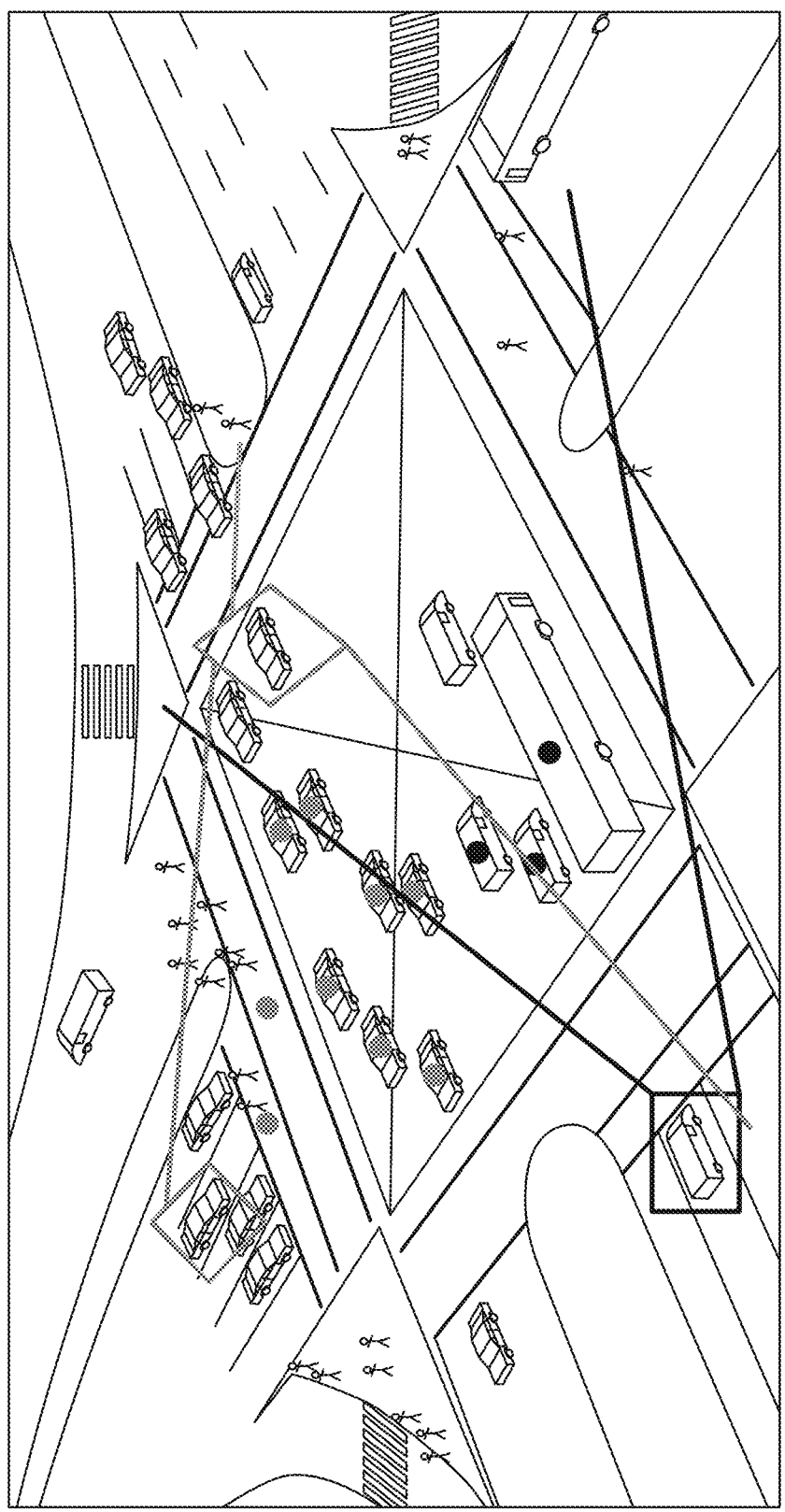

FIGS. 5A-C show an intersection with actors identified with circles and peer vehicles identified with diamonds.

Example Scenarios

Some scenarios will illustrate the benefits of the invention.

Scenario 1

In a first scenario, a car A approaches a corner, prepared to make a left turn. Car B, a non-autonomous vehicle (non-AV), outside of car A's view and thus unseen by car A, approaches the corner from a direction opposite car A. Car B is prepared to make a right turn, directly into car A's path. A camera, part of a coordinating network, views the scene and predicts possible trajectories of car B. In one embodiment, the camera transmits options to car A, displayed to its driver on a display screen, such as STOP or ACCELERATE. In another embodiment, car A receives the option and automatically stops the car.

Scenario 2

Car A transmits traffic blockage information on a current route. Car B, two blocks away and about to take the same route, receives the traffic blockage information. Car B's Exhaust Gas Oxygen (EGO) drive suggests postponing a right turn and cruising at a lower speed for two blocks, followed by a right turn. Car B thus enjoys ECO-savings points.

Scenario 3

Car A, in a middle lane of a road, needs to make a right-hand turn in front of car B and requests a right-hand merge. Car B accepts the request, slows, and allows car A to merge right.

Mapping Environments

In accordance with the embodiments, environments can be mapped to determine prediction modules. For example, a map can be based on information such as the location of a school nearby, rights of way, and the like. Maps can also divide areas into regions, such a low-interest and a high-interest region. For example, a low-interest region is one that historically has little pedestrian or other traffic, and thus does not have to be monitored, that is, location data from the area need not be captured, processed, and communicated. In this case, it may be determined that only subsets of a low-interest region should be monitored. A high-interest region, on the other hand, has heavy traffic and thus should be monitored for object movement.

It may also be determined that certain agents are less reliable than others. For example, a tree or recent construction may block the agent's view of a scene. In this case, location and object data from the agent can be temporarily ignored.

Merging

Preferably, a merged environment is formed by aligning (overlapping) one or more similar static objects from different views. The views are then matched to get a common frame of reference. For example, two sensors can identify and match a tree to thereby align their frames of reference. In one embodiment, different agents give the coordinates (e.g., X and Y coordinates) of each object relative to their own frame of reference. Each actor then aligns the objects to its individual frame of reference.

Preferably, the merging process uses a mapping process to determine which subsets of data, if any, can be ignored, thereby reducing the processing required.

Components

Figure 6:
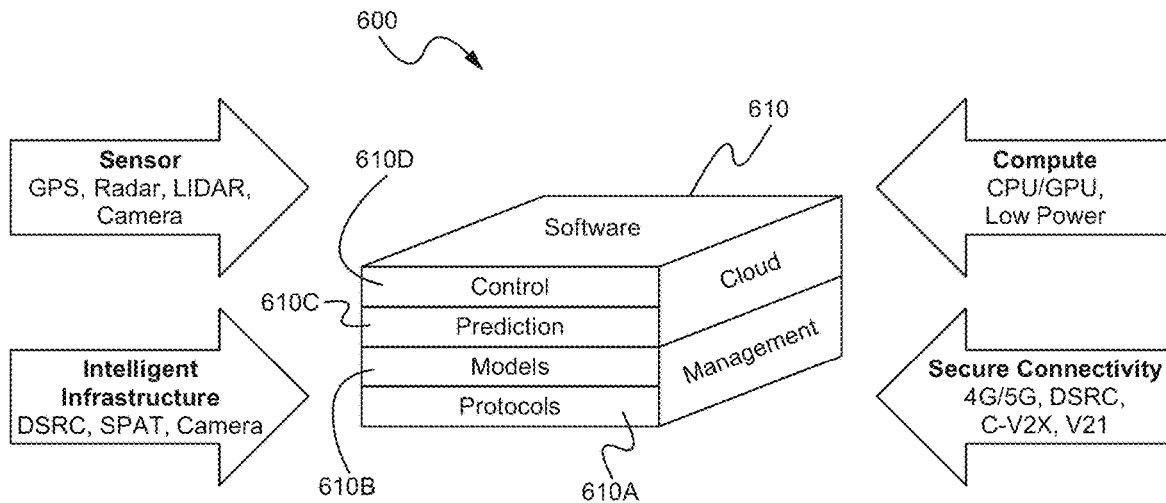
FIG. 6 is a block diagram of the components of a system for coordinating movements in accordance with one embodiment of the invention.

FIG. 6 is a high-level block diagram of the components of a system 600 in accordance with one embodiment of the invention. The system 600 includes a software stack 610 that includes a Protocols module 610A, a Models module 610B, a Prediction module 610C, and a Control module 610D. The Protocols module 610A and Models module 610B form a Management layer and the Prediction module 610C and Control module 610D form a cloud layer.

The software stack 610 receives location information from sensors such as global positioning systems (GPS), radar, LIDAR (a detection system similar to radar, but which uses light from a laser), or cameras, to name only a few sensors. The software stack 610 is also coupled to an intelligent infrastructure such as dedicated short-range communications (DSRC), signal phase and timing (SPaT) for traffic light control, and cameras. The system 600 runs on central processing units (CPU), general processing units (GPUs), or a combination of both, and has a secure connectivity such as with 4G/5G, DSRC, C-V2X, or vehicle-to-infrastructure (V2I) communications.

Connectivity

Connecting agents and actors in accordance with the invention provides several advantages, such as:
1. The ability to build and update models based on large amounts of data from a single vehicle as well as from a set of connected vehicles.
2. The ability to make inferences in real time in the cloud and on the edge (e.g., at a vehicle), without the need for expensive high-performance computation in vehicles.
3. The ability to deploy embodiments of the invention in vehicles with lower-cost computing platforms, small footprint neural networks. The machine learning/training of the in-vehicle neural networks are performed by model engines.

After reading this disclosure, those skilled in the art will recognize other advantages.

Figure 7:
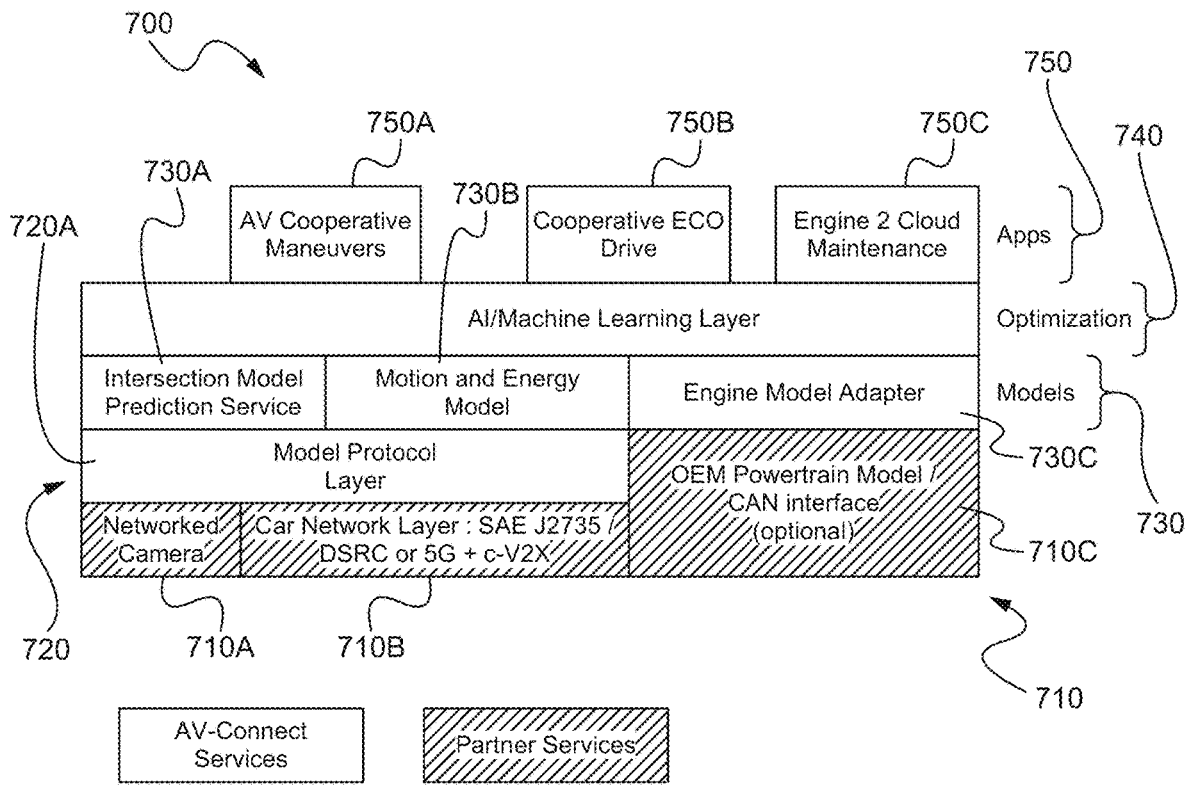
FIG. 7 is a block diagram of a software stack for an original equipment manufacturer in accordance with one embodiment of the invention.

FIG. 7 is a block diagram of a coordinating Network Software Stack 700 for OEM in accordance with one embodiment of the invention. In a first level, the Stack 700 includes a networked camera 710A and a car network layer: SAE J2735/DSRC or 5G+C-V2X 610B, which supports, on a second layer, a Model Protocol layer 720A. In some embodiments, a V2X element understands SPaT signals to detect rights of way and thus predict which actors will stop at a stop light intersection and which will proceed through it. The Model Protocol layer 720A supports, on a third layer, an Intersection Model Prediction Service 730A and a Motion and Energy Model 730B. Also spanning the first and second layers is an optional OEM Powertrain Model/CAN Interface 710C, which supports, on a third layer, an Engine Model Adapter 730C. A fourth layer of the stack 700 includes an AI/Machine Learning module 740. A fifth layer of the Stack 700 includes an AV Cooperative Maneuvers layer 750A, a Cooperative ECO Driver layer 750B, and an Engine 2 Cloud Maintenance layer 750C. The Machine Learning/AI module 740 is the level where models at a lower level are used to make inferences and provide optimized decisions at higher-level layers, such as layer 750. As shown in FIG. 7, services in accordance with the embodiments of the invention are shown as clear, and partner services are shown hatched.

Figure 8:
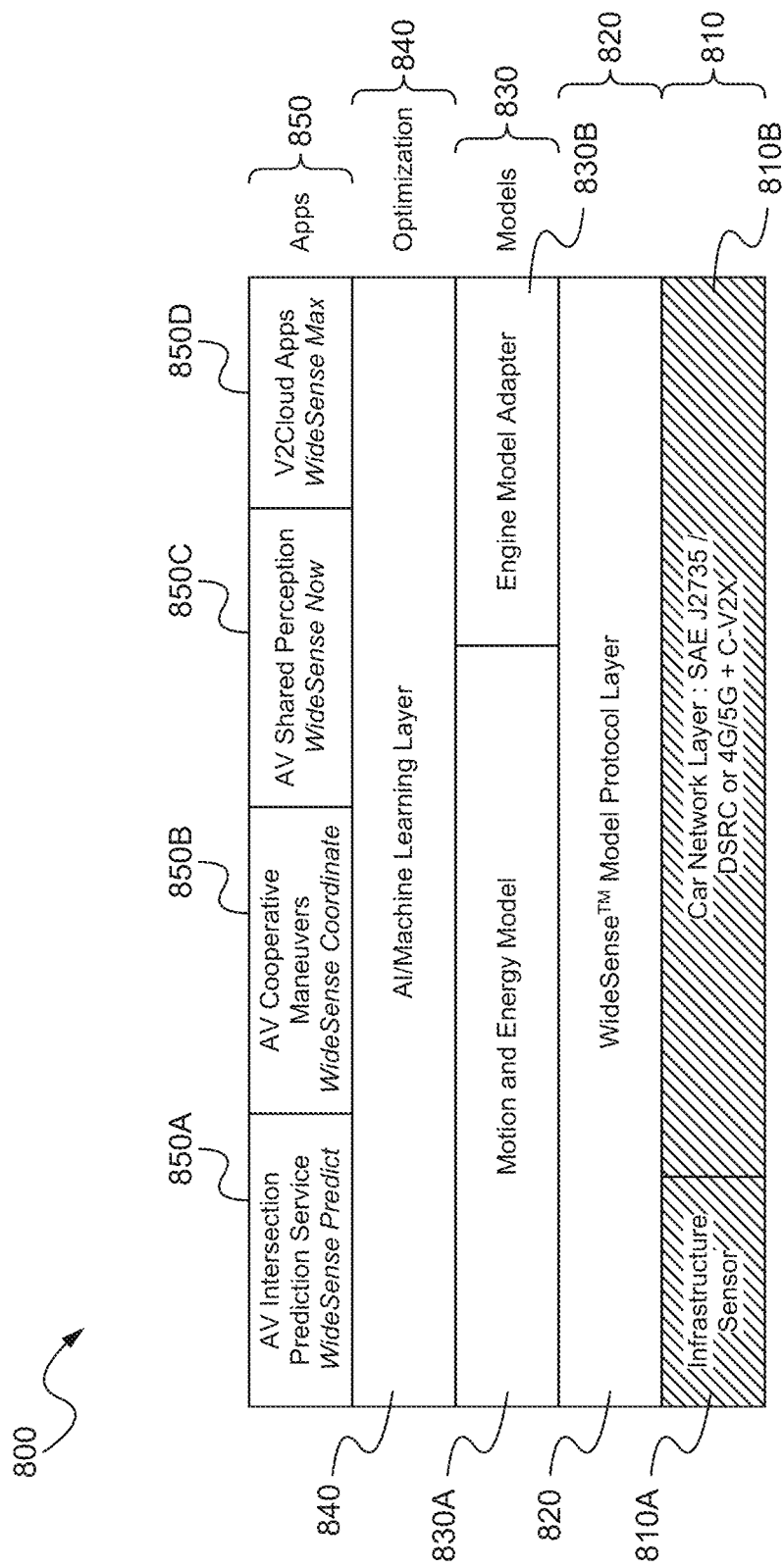
FIG. 8 is a block diagram of a software stack for an automated vehicle in accordance with one embodiment of the invention.

FIG. 8 is a block diagram of a coordinating network software stack 800 for AV. In a first layer 810, the stack 800 includes an infrastructure sensor 810A (such as a networked camera) and a car network layer: IEEE SAE J2735/DSRC or 5G+C-V2X 810B, which supports, on a second layer 820, a WideSense™ Model Protocol layer 820. The Model Protocol layer 820 supports, on a third layer 830, a Motion and Energy Model 830A and an Energy Model Adapter 830B. The third layer 830 supports a fourth layer, an AI/Machine Learning Layer 840. The fourth layer 840 supports a fifth layer 850, which includes an AV Intersection Model Prediction Service 850A, an AV Cooperative Maneuvers module 850B, an AV Shared Perception WideSense™ Now module 850C, and a V2Cloud Applications WideSense™ Max 850D. As shown in FIG. 8, services in accordance with the embodiments of the invention are shown as clear, and partner services are shown hatched.

Figure 9:
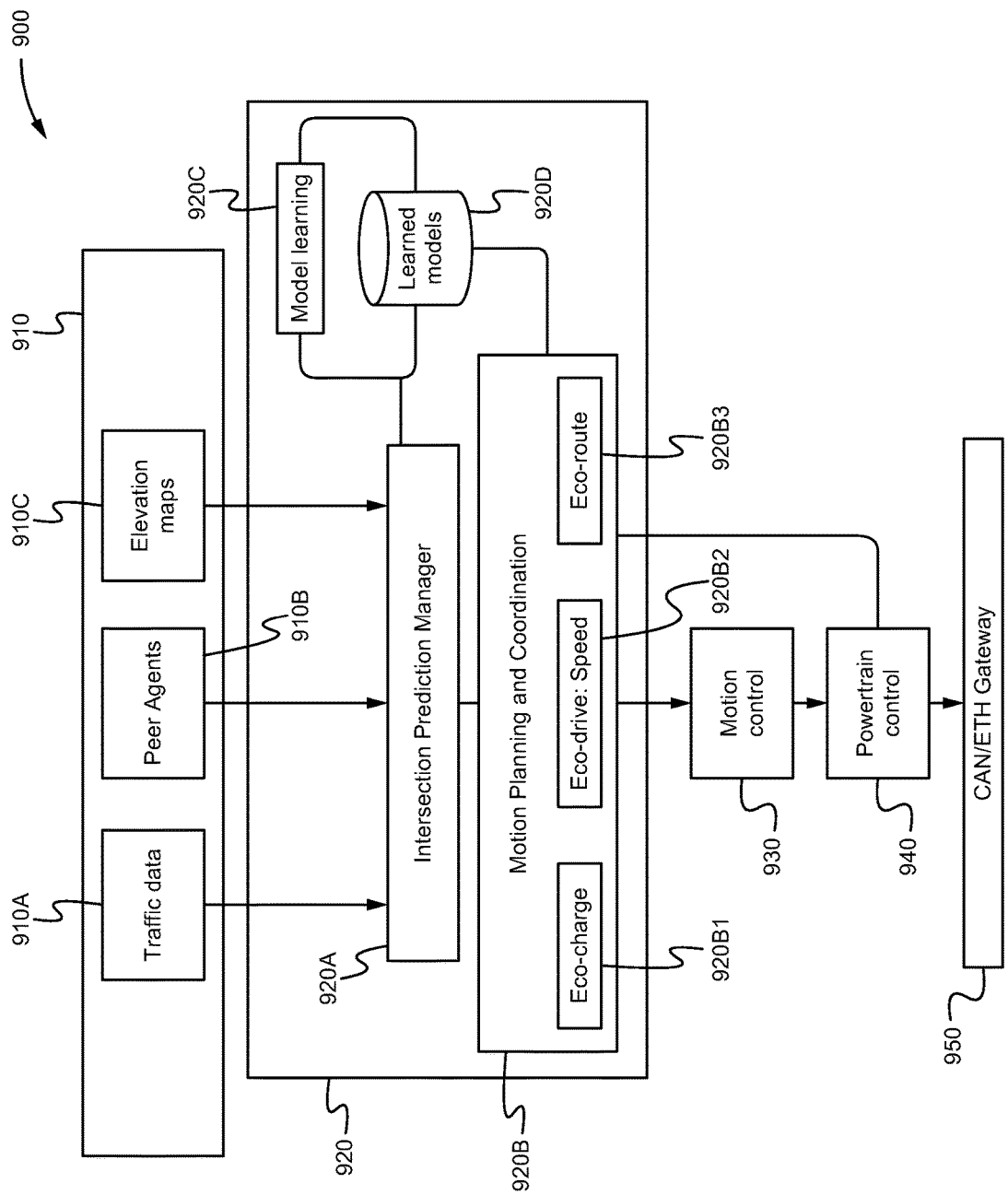
FIG. 9 is a block diagram of a software stack in accordance with one embodiment of the invention.

FIG. 9 is a block diagram of a WideSense™ Software Stack AV 900 in accordance with one embodiment of the invention. The stack 900 includes a Module 910 that includes Traffic Data 910A, Peer Agents 910B, and Elevation Maps 910C. The Module 910 is coupled to a Module 920 that includes an Intersection and Prediction Manager 920A, a Motion Planning and Coordination Module 920B, a Model Learning module 920C, and a Learned Models module 920D. The Intersection Prediction Manager 920A is coupled to the Motion Planning and Coordination module 920B, the Model Learning module 920C, and the Learned Models module 920D, which in turn is coupled to the Motion Planning and Coordination Module 920B. The Motion Planning and Coordination Module 920B includes an Eco-charge 920B1, an Eco-Drive: Speed 920B2, and an Eco-route 920B3. The Motion Planning and Coordination Module 920B is coupled to a Motion Control 930 and a Powertrain Control 940. The Power Control 940 is coupled to the Motion Controller 940 and a CAN-Ethernet (CAN/ETCH) Gateway 950.

In operation, the Intersection Prediction Manager 920A receives Traffic Data 910A, information from Peer Agents 910B, and Elevation Maps 910C, to generate predicted location information. The predicted location information is input to both the Learned Models module 920D and the Model Learning module 920C. The Learned Models module 920D includes historical predictive models, such as discussed above. The Model Learning module 920C uses analysis to update the Learned Models 920D using learning algorithms. The Motion Planning and Coordination Module 920B use predicted trajectories and other information to generate the current vehicle's path using the Eco-charge 920B1, Eco-drive speed 920B2, and Eco-route 920B3. This information is then transmitted to the Motion Control 930 and Power train control 940 to maneuver the vehicle. This information is then transmitted over the CAN/ETH Gateway 950 to other vehicles on the network so that the movements can be coordinated, in accordance with the invention. The following description gives examples of shared information in accordance with one embodiment of the invention.

Preferably, the software stacks 600, 700, 800, and 900 all operate on an autonomous vehicle. It will be appreciated, however, that their functionality can be distributed across remote systems.

Figure 10:
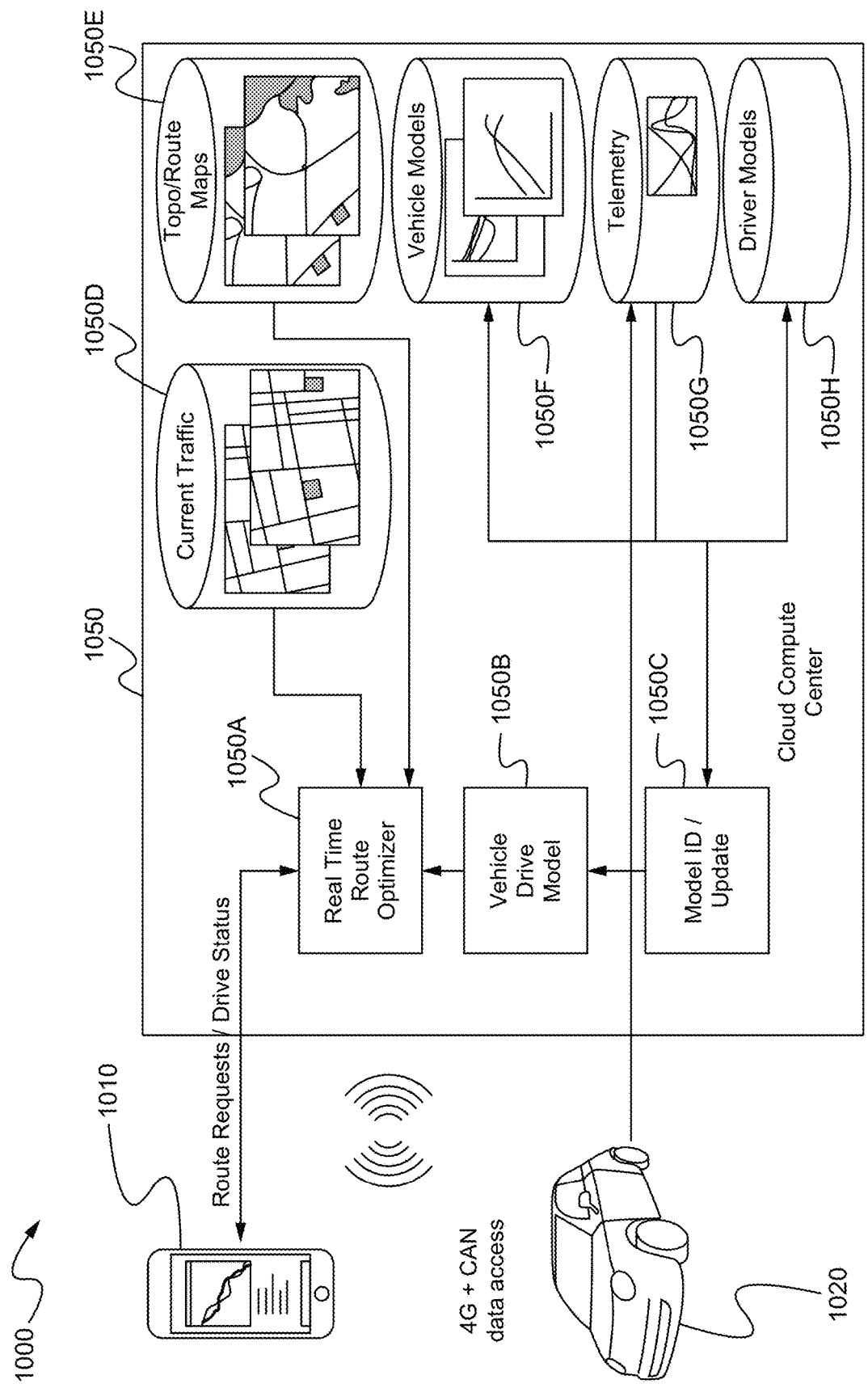
FIG. 10 shows a Cloud Compute Center including a software stack in accordance with another embodiment of the invention.

FIG. 10 illustrates an example of the WideSense™ Software Stack AV 900 of FIG. 9 in a Cloud Compute Center 1050 in accordance with one embodiment of the invention. The Cloud Compute Center 1050 exchanges route requests and suggested routing information with a smart phone or other suitable device, such as one used by an occupant of a vehicle. The Cloud Compute Center 1050 includes a Model/ID Update module 1050C coupled to a Vehicle Driver Model module 1050B, which in turn is coupled to a Real-Time Route Optimizer 1050A. The Real-Time Route-Optimizer 1050A receives inputs from a Current Traffic module 1050D and a Topographic/Route Maps module 1050E. The Model ID/Update module 1050C exchanges data with a Vehicle Models module 1050F, a Telemetry module 1050G, and a Driver Models module 1050H.

In operation, a vehicle 1020 transmits environment and other data to the Telemetry module 1050G. The Model ID/Update module 1050C uses data from the Driver Models module 1050H, the Telemetry module 1050G, and the Vehicle Models module 1050F to determine and update vehicle performance models in accordance with the invention. The Model ID/Update module 1050C transmits data to the Vehicle Drive Model module 1050B, which determines a specific Vehicle Drive model, and which in turn inputs model and other information to the Real-Time Route Optimizer module 1050A. The Real-Time Route Optimizer module 1050A uses this data along with data from the Current Traffic module 1050D and the Topographic/Route Maps module 1050E to send route information to a smart phone or other intelligent device 1010, such as one used by a driver or occupant of the vehicle 1020. The smart phone 1010 can initiate this process by sending a Route Request command and Driver status information to the Real-Time Route Optimizer 1050A. The vehicle 1020 and smart phone 1010 can communicate with the Telemetry module 1050G and Real-Time Route Optimizer 1050A using 4G+ CAN data access or other suitable communication protocols.

Figure 11:
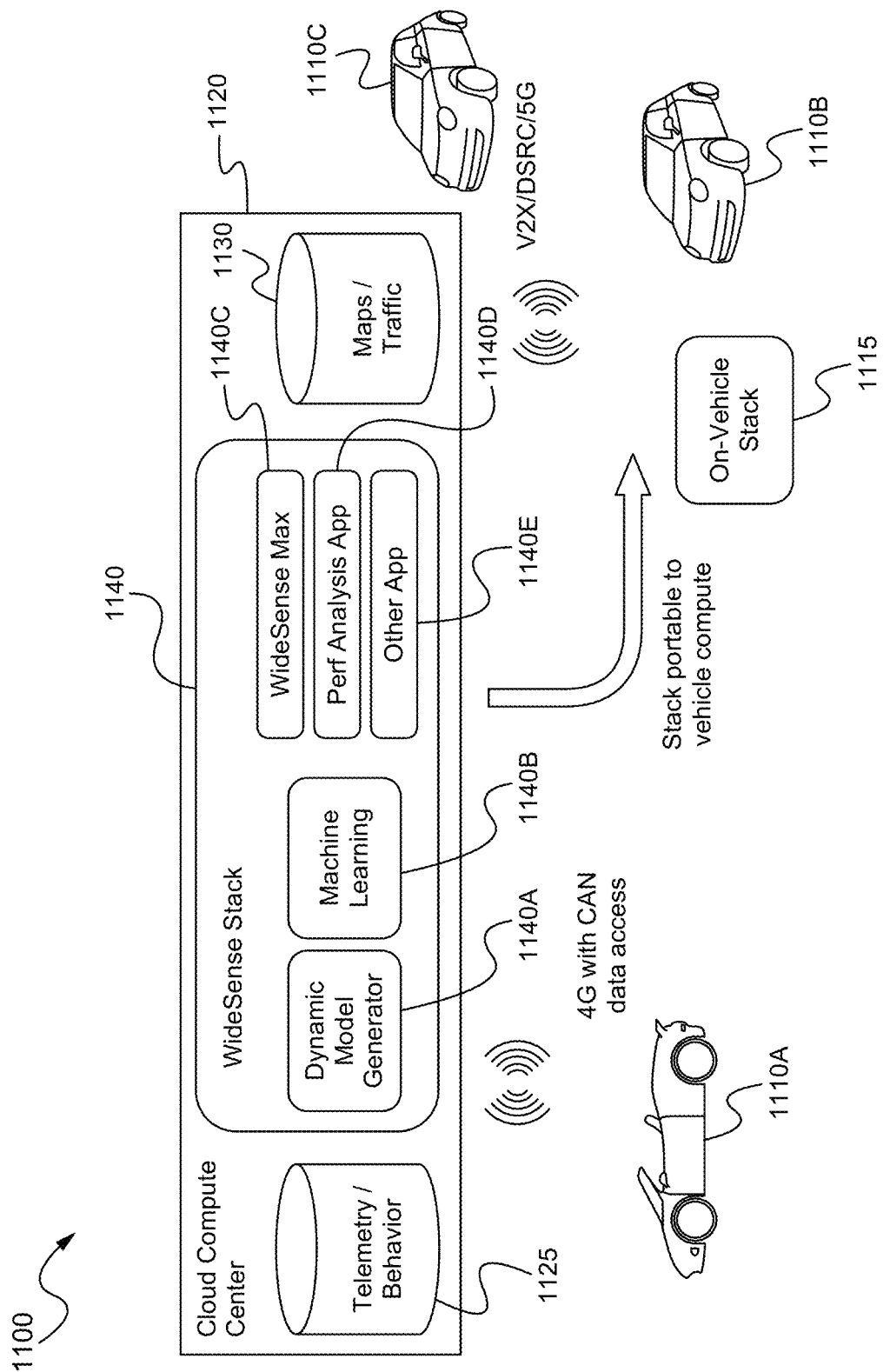
FIG. 11 shows a Cloud Compute Center including a WideSense™ Stack having a Machine Learning module in accordance with one embodiment of the invention.

FIG. 11 shows the elements of a networked system 1100 including a Cloud Compute Center 1140 for exchanging control and other data with vehicles 1110A, 1110B, and 1110C in accordance with the principles of the invention. The Cloud Compute Center 1140 includes a Telemetry/Behavior module 1125, a WideSense™ Stack 1140 that incorporates machine learning, and a Maps/Traffic module 1130. The WideSense™ Stack 1140 includes a Dynamic Model Generator 1140A, a Machine Learning (ML) module 1140B, a WideSense™ Max application 1140C, a Performance Analysis application 1140D, and Other applications 1140E.

Preferably, instances of the WideSense™ Stack 1140 are downloaded onto the vehicles 1110A-C as on-vehicle stacks 1115. In one embodiment, the Telemetry/Behavior module 1125 receives driver behavior and measurement data from remote locations, such as the vehicles 1110A-C. The Maps/Traffic module 1130 stores maps and other route information and generates routing data based on current traffic, predicted traffic, or both.

In accordance with the principles of the invention, the WideSense™ Max application 1640C lowers energy costs and increases the range for a driver by providing real-time route recommendations based on a set of driver selected priorities including (1) time of arrival, (2) vehicle range, (3) total trip costs, and (4) favorite stops, to name only a few examples. The Machine Learning engine 1140B can learn a driver's patterns and, using the Maps/Traffic module 1130, suggest personalized routes and charging locations and times based on the driver's preferences, including costs, and predicted traffic along specified routes.

In operation, the Dynamic Model Generator 1140A uses data from the Telemetry Behavior module 1125 to generate environment models, which are updated using the Machine Learning module 1140B, in accordance with the invention. The models are used by the WideSense™ Max application 1140C, along with the Maps/Traffic module 1130, to suggest the real-time route recommendations. The WideSense™ Max application 1140C is updated by the Performance Analysis Applications module 1140D as well as any other optional applications in the Other Applications module 1140E.

The Cloud Compute Center 1120 is able to communicate with the vehicles 1110A-C using 4G with CAN data access, V2X/DSRC/5G, or other suitable protocols.

Shared Information

Figure 12:
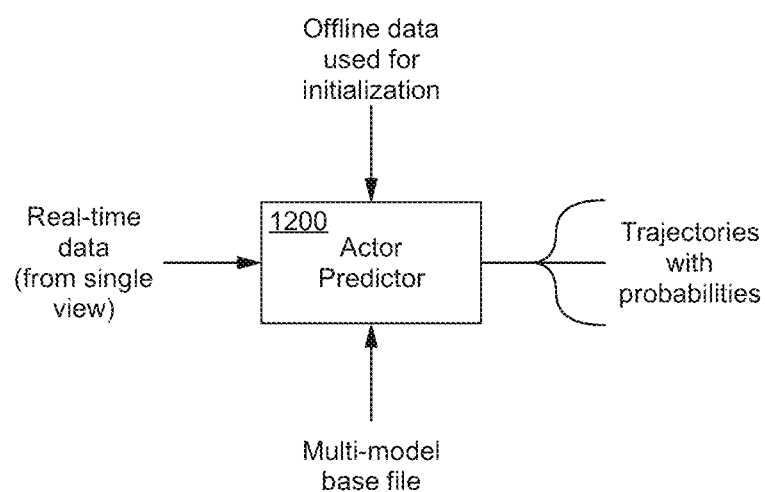
FIG. 12 is a block diagram showing inputs and outputs of an actor predictor in accordance with one embodiment of the invention.

For each target, each actor shares its
 1. Location
 2. Current speed and heading
 3. Unique ID
 4. Predicted Movement
 5. Actor List (list of actors from whom location data is to be received)
 6. Vehicle attribute, such as type, weight, power, and acceleration Actor Predictor FIG. 12 is a block diagram of an Actor Predictor 1200 in accordance with one embodiment of the invention. The Actor Predictor 1200 takes as input (1) offline (historical data) to initialize a prediction model, (2) real-time data (from a single view), and processes the inputs using a multi modal-based filter, such as a Kalman filter. The filter processes the data for different modes, such as when a pedestrian is running or walking, or a car is turning or keeping straight, to generate trajectories with probabilities, such as shown in FIG. 2.

In one embodiment, historical data for an area is captured by a fixed agent, such as the fixed sensor 140 of FIG. 2. The traffic in the area is collected over a period of time. The traffic is then processed, such as by averaging, to determine the traffic density for any period of time, such as for a given day, at a given time. As one example, when determining pedestrian trajectories (e.g., probability of taking a certain path), the most common path is determined, thereby simplifying the trajectory when making predictions.

Preferably, actor predictors on different vehicles operate in parallel, thus reducing computer processing time. For example, location information for different targets can be processed in parallel on different vehicles and then shared. As another example, on a vehicle with a multi-core electronic control unit, actor predictors for different actors execute in parallel on different cores. In a different embodiment, the actor predictors operate on GPUs, such as those manufactured by Nvidia®. It will be appreciated that actor predictors can operate on different processors in different ways in accordance with embodiments of the invention.

Intelligence

In accordance with the principles of the invention, decentralized eco-control strategies are developed for traffic intersections, which are able to seamlessly adapt to different parameterized scenarios. Two fundamental parameters of the scenarios are the number of connected AVs and the number of connected traffic lights. The technical approach encompasses a control-oriented model of the AV's energetics, including the longitudinal dynamics, and the efficiency curves of the main elements of the AV's powertrain.

The control approach is based on a stochastic Model Predictive Control (MPC) framework. The system seamlessly adapts to different parameterized connected scenarios (with different numbers of connected vehicles and the number of connected traffic lights) by using an intersection prediction manager (IPM). The intersection environment is predicted by the IPM using a local model of the environment, local sensors, and communicated information. When possible, the IPM outputs prediction of surrounding vehicle movements, SPaT predictions, local lane flow predictions, and local agents predictions, to name only a few possibilities. All of these predictions are used to generate vehicle movements, such as described above.

It will be appreciated that predictions have an associated uncertainty. Uncertain predictions are passed to the eco-MPC controller, which will send setpoints to the AV's Adaptive Cruise Control or provide lane-change recommendations to the driver. Alternatively, rather than sending setpoints, a high-level Power train command can also be incorporated. The more connected AVs and connected lights, the better the predictions, where "better" means accuracy pointwise in time and space over the predicted path.

Safety Set

In accordance with some embodiments of the invention, safety features are implemented. In one embodiment, around each trajectory is a safe set. As one example, a safe set is a parameterized representation of an area, such as a parameterized representation of a polyhedron, $$Ax \in b \quad \text{(Equation 1)}$$

or an ellipsoid, $$\|X-X_c\|_B \le r \quad \text{(Equation 2)}$$

which is the norm of X from a center, where r is a radius. The set B describes which of the parameters is safe, that is, which set of parameters ensures the safe movement of the vehicle, such as by avoiding collisions with other actors and objects.

Here, X is a set of parameters of a motion, $$X = \begin{bmatrix} X \\ Y \\ \psi \end{bmatrix} \quad \text{Equation (3)}$$

X and Y are global position, and $\psi$ is yaw rate.

Parameterized motion r is a function of distance from target.

$$r = \begin{bmatrix} d1 \\ d2 \\ \cdot \\ \\ \cdot \\ dn \end{bmatrix} \quad \text{Equation (4)}$$

Given a vehicle, a scene, and a motion, the system is able to determine a safe set. The parameters of the safe set are determined in part by vehicle motion. For example, given a specific vehicle, the scene is a location on a highway, and a motion is straight, the set of parameters is to slam on the brakes. As a second example, given a vehicle and a motion is a left turn, given that the scene is an intersection with a car crossing the vehicle's path, the set of parameters gives the actor sufficient time to slam on the brakes, swerve to avoid colliding with an object, or take other evasive maneuvers.

In accordance with one embodiment of the invention, when vehicles are communicating and coordinating their movements, the equation is parameterized:

$$A(\Theta)x \in b(\Theta) \quad \text{Equation (5)}$$

The motion coordinator decides the parameters for the safe sets. Preferably, each actor in a region of interest has a safe set.

Figure 13:
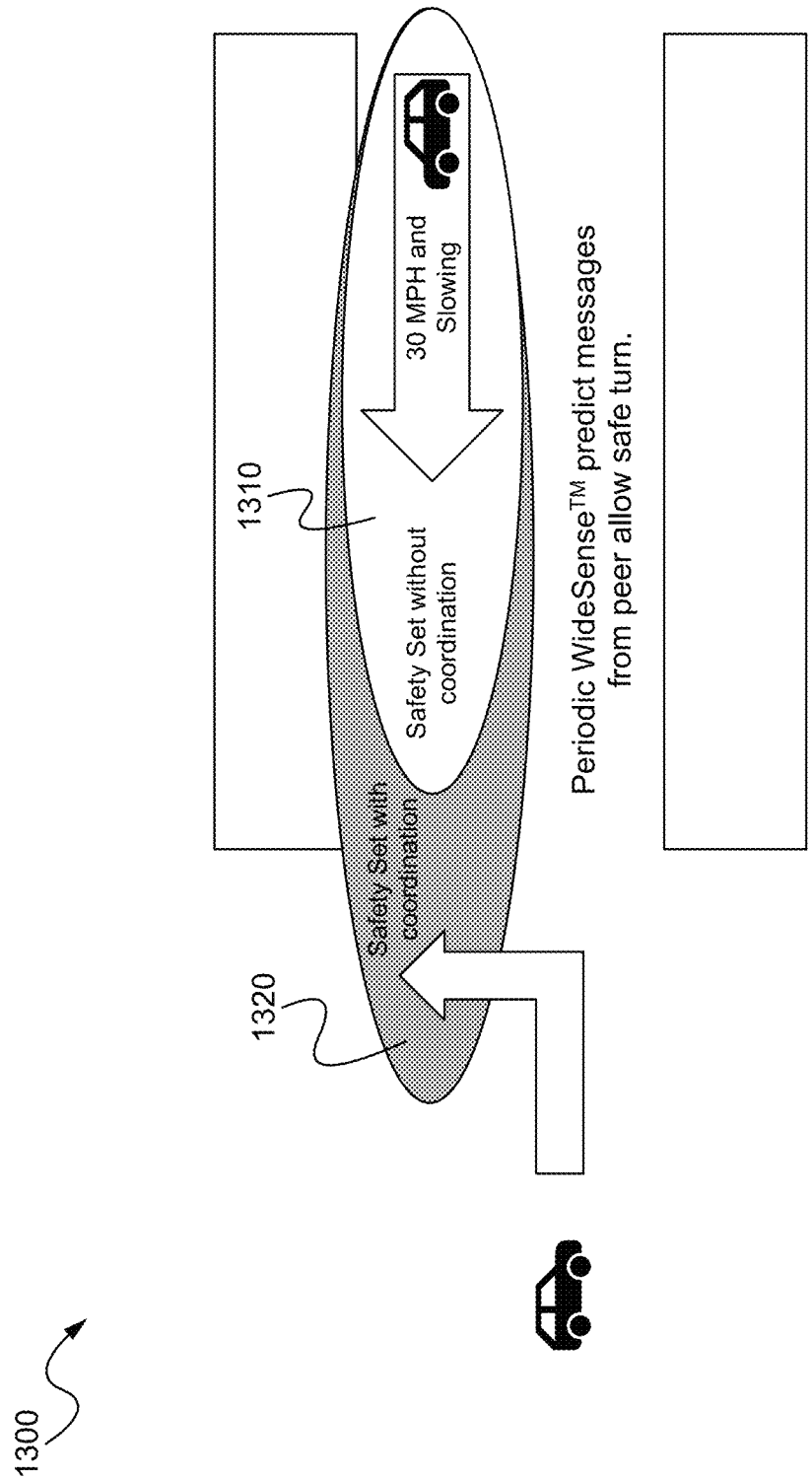
FIG. 13 illustrates car moving relative to a safe set in accordance with one embodiment of the invention.

FIG. 13 depicts a safe set 1300 in accordance with one embodiment of the invention. Here, the safe set is in the shape of an ellipse. As shown in FIG. 13, the safe set 1310 with coordination is smaller than a safe set 1320 without coordination.

Embodiments using a safe set have a higher performance because the system in the coordinating network knows what each vehicle is doing. Each vehicle can thus be controlled more quickly and in a tighter space, and the size of the safe set can be reduced. Because the sizes of the safe sets are reduced, actors can travel with less distance between them, travel time is reduced, with the cost savings increasing with the number of vehicles moving in a coordinated group or platoon. It will be appreciated that while these examples show the safe set as a polyhedron or an ellipsoid, other geometric shapes can also be used.

Preferably, each vehicle in a platoon is aware of time bounds of the safe set. The time limit is defined by a safe set from which positive confirmation is required from every actor, indicating that the actors will all take the actions indicated. Each vehicle has a timeout for any monitored communication. In these embodiments, autonomous vehicles within a network must acknowledge communication with each other within a set time to ensure safe movements, similar to a heartbeat signal.

As one example car A and car B in a coordinating network arrive at an intersection, with car A about to make a left-turn across car B's path. If car A has not received an acknowledgment from car B, indicating that the two are still in communication, either directly, by a central coordinator, or otherwise within a predetermined time period, car A will abort its turn.

Figure 14:
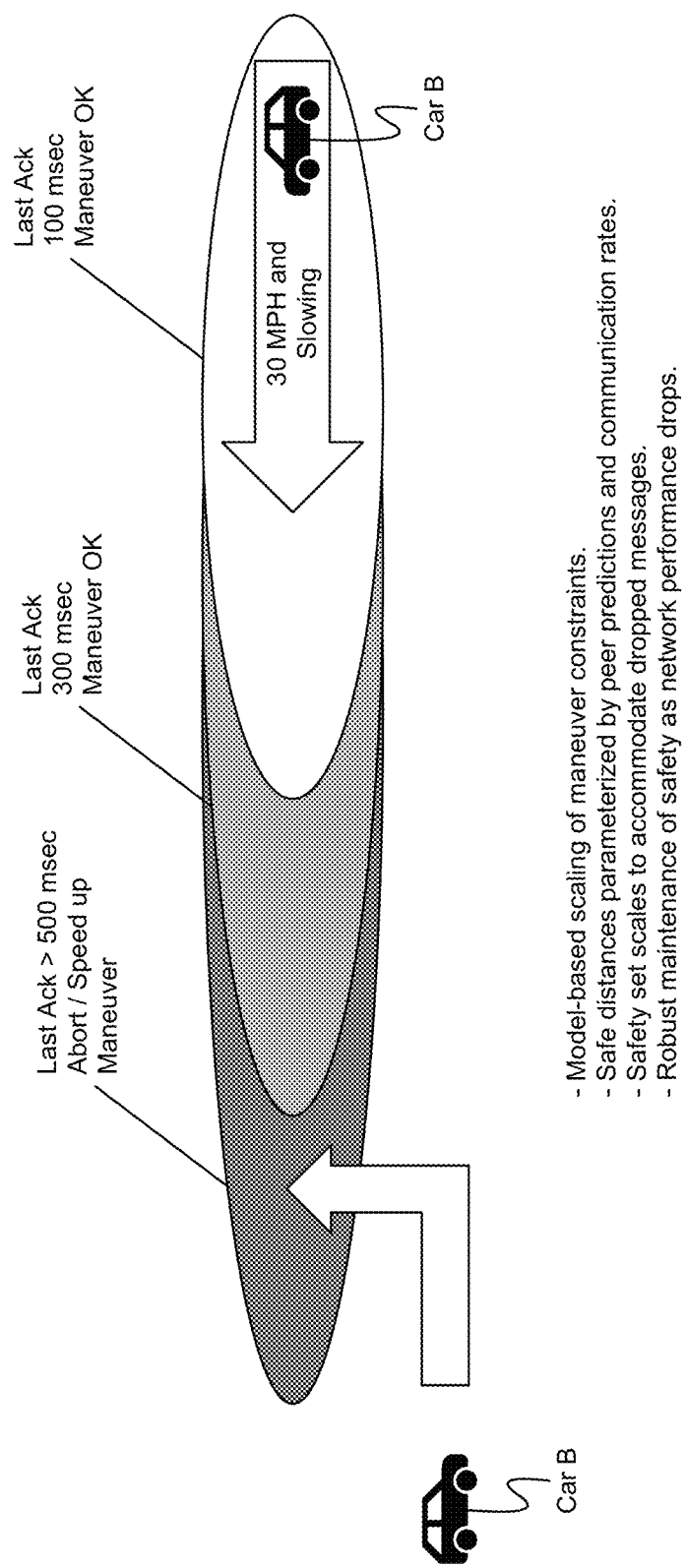
FIG. 14 illustrates a positive acknowledgment for a safe set in accordance with one embodiment of the invention.

FIG. 14 shows a system illustrating a positive acknowledgment. As shown in FIG. 14, if the last acknowledgment between car A and car B was 100 ms and 300 ms ago, any maneuver is allowed. However, if the last acknowledgment was more than 500 ms ago, the maneuver is aborted or another evasive action taken, such as car B accelerating to make a left turn before car A arrives at the intersection.

This example illustrates model-based scaling of maneuver constraints. Here, safe distances are parameterized by peer predictions and communications and safety sets are scaled to accommodate dropped messages, ensuring robust maintenance of safety as network performance drops.

Grouping/Platooning

As explained in more detail below, actors can be grouped (platooned) so that the movement of multiple moving actors can be coordinated, such as on a highway. In one embodiment, a platoon is formed based on a similar intermediate or final destination, and a proximity of the actors. In accordance with some embodiments, a leader of the group is selected and, based on the context, the movements of all the vehicles are coordinated. As one example, car A in a left-hand lane wishes to merge between car B and car C in the right-hand lane. Car A is selected as the leader. The movements of cars B and C are coordinated so that a space opens up between them. Car A slides into the opened space and exits. When car A exits, a new leader may be selected from car B and car C.

In one embodiment, platoons are determined automatically using a global positioning system, which determines vehicles that are within a predetermined distance of each other. In another embodiment, sensors are spaced along a route, such as a highway. Each sensor monitors the vehicles as they pass, grouping those that are within a predetermined distance of each other. The system can make merge and related decisions based on these groupings.

Preferably, merge criteria are established to ensure smooth merging, such as requiring that during merging a vehicle does not accelerate to more than or decelerate to less than 10% of its current speed within a 5-second interval. Those skilled in the art will recognize other possible merge criteria.

As one example, cars are platooned when one car puts on its turn signal, notifying other cars that it wishes to join a platoon. In other embodiments, platooning can be triggered in other ways.

Vehicles can also be platooned to increase the saturation flow at a traffic intersection. This effectively increases a stop light's green duration and reduces the number of stops along a route.

Warning and Suggestions

In some embodiments, an actor uses movement predictions to generate suggestions or warnings that are displayed to a driver of a non-AV, such as a vehicle equipped with a camera, radar, and modem. For example, based on the predicted movements of actors and objects, the non-AV can receive warnings such as "Slow Down, Heavy Traffic Ahead" or "Change Engine Profile, Heavy Traffic Ahead," or suggestions such as "Take Belmont Street." In other embodiments, the warnings can be displayed on a mobile phone or other device.

Collaboration Protocol

In one embodiment, a collaboration protocol is used to collaborate maneuvers between individual systems. The protocol exchanges messages and includes several modules.

Messages

The messages include (1) an ID signal, which establishes a link between a media access control (MAC) address on an actor and a Group ID, and (2) a Heartbeat signal (e.g., for monitoring safe set acknowledgments), which is parameterized by frequency and loss until a drop.

Figure 15:
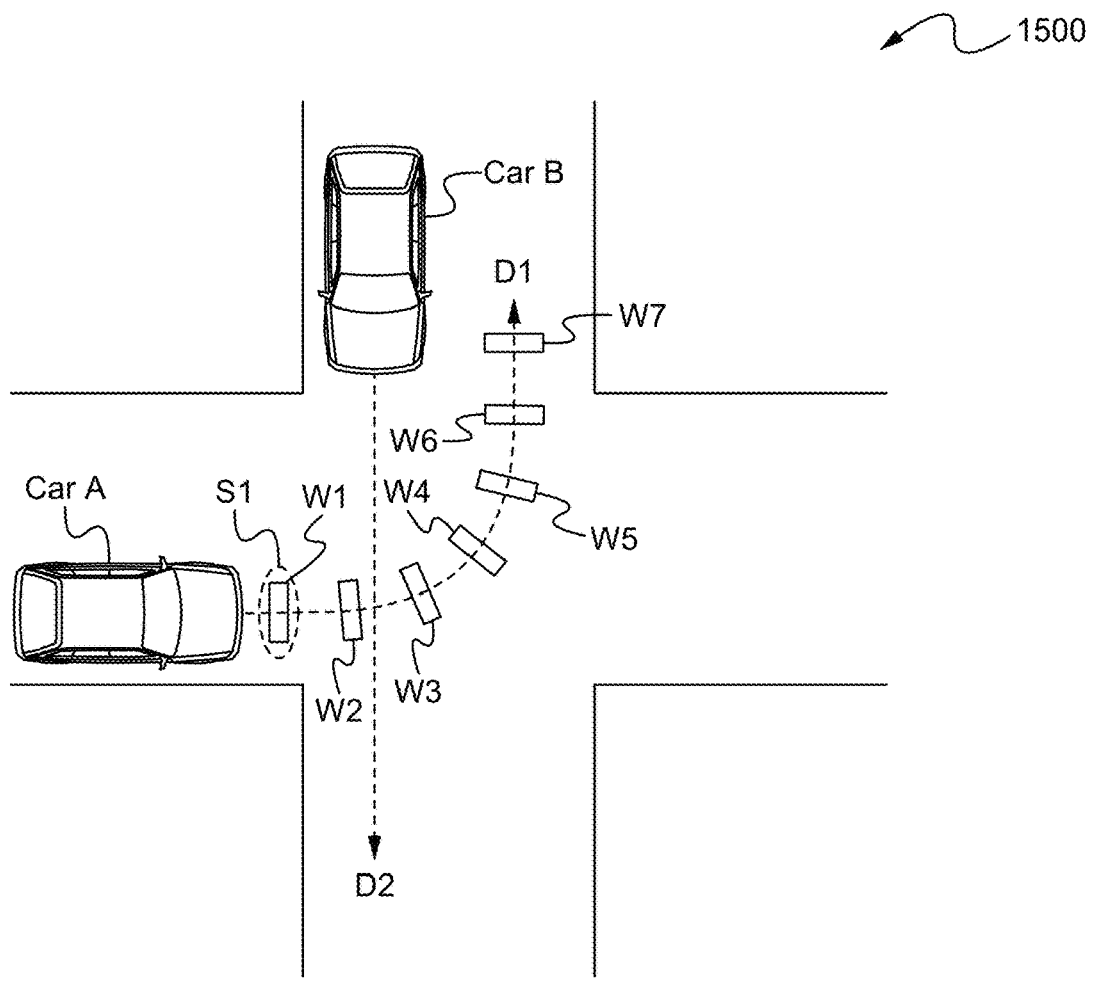
FIG. 15 shows a vehicle and a requested path in accordance with one embodiment of the invention.

FIG. 15 illustrates how two actors, car A and car B, can maneuver. Here, car A wishes to turn left, that is, proceed along path D1. Car B wishes to go straight, that is, proceed along path D2. Along its path, car A travels through "waypoints," W1-W7," intermediate locations along the path D1, virtual locations used to coordinate movements. The locations of the waypoints can be spaced apart in any suitable manner. In one embodiment, each of the waypoints W1-W7 is surrounded by a safe zone, such as described above. At each waypoint W1-W7, car A's movement can be monitored to reduce the risk of collisions. Though FIG. 15 shows waypoints only for car A, it will be appreciated that waypoints are also constructed for car B.

In one embodiment, car A inputs a destination (that includes path D1) into its onboard processor. If it is determined that it is safe for car A to proceed along the path D1, car A may receive instructions in different formats, such as a "Turn Left" instruction, the sequence of waypoints W1-W7, instructions that designate the path D1, or any other suitable instructions.

Joint Maneuver State Module

Figure 16:
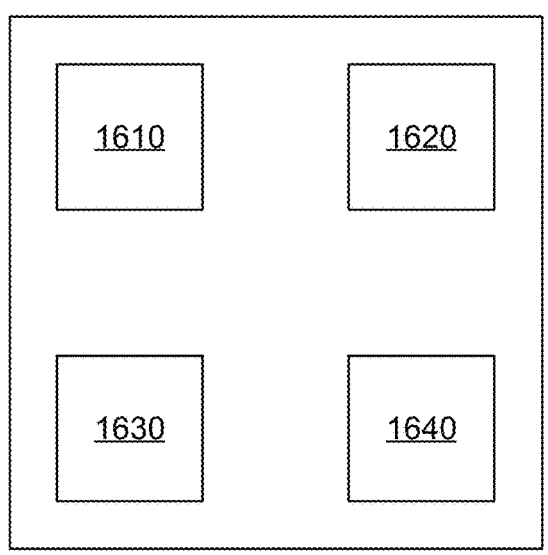
FIG. 16 is a block diagram of the components of a joint maneuver state module in accordance with one embodiment of the invention

FIG. 16 shows the components of a joint maneuver state module 1600 in accordance with one embodiment of the invention. The module 1600 includes a Maneuver Type 1610, a Peer List 1620, a Maneuver Plan 1630, and a Maneuver Relaxation Plan 1640. The Peer List 1620 is a list of peers executing a maneuver, including the time of agreement and the last communication time. The Maneuver Plan 1630 includes a) a peer arriving at a waypoint, b) a relative location of the waypoint, c) the approximate heading and speed of the peer at the waypoint, d) the time when the peer will reach the waypoint, e) the safety time margin, that is, the maximum time for receipt of update of each peer's state (e.g., an acknowledgment), and f) the peer physical margin, that is, the maximum deviation from the waypoint time, location, and speed that still indicates maneuver compliance. The Maneuver Relaxation Plan 1640 includes a list of planned adjustments to the car's waypoints in case the maneuver agreement is violated. This plan can be overridden by a lower level driving control of the car.

Maneuver Grouping Mechanism

Preferably, maneuvers are coordinated among actors in a platoon. This function is callable from any car to any subset of cars in a peer list. The mechanism will broadcast a maneuver plan with a list of IDs from possible peers. A maneuver plan is initiated when positive acknowledgment is received from a sufficient subset of possible peers.

Preferably, when performing this function, a set of waypoints is proposed for a group. In a WideSense™ model, (1) a solicitation group is selected, (2) an abort plan for a maneuver is selected, and (3) a timeout for each actor in the maneuver is selected to abort a maneuver based on the combined safety set. This mechanism is illustrated in the following examples.

Example Maneuver 1—Lane Merge with 2 Cars Assisting

In this example, three cars identify themselves as "cooperation capable" with known positions based on their Widesense™ models. Two cars {C1, C2} are situated in the right-hand lane of a one-way, two-lane highway. The requesting car Cr is situated in the left-hand lane, next to C1 and C2. In this maneuver:

1. Cr sends a plan that indicates a slowing set of waypoints for C2 and a set of constant velocity waypoints for C1.
2. Cr's waypoints are a safety bounded merge to the right lane in front of C2 with a slight increase in speed.
3. Cr's relaxation plan is a re-merge into the left lane.
4. Cr's safety time margin is 0.5 seconds silence from either peer, resulting in a maneuver abort.
5. C1 and C2 respond with affirmative signals
6. Cr executes the maneuver.
7. When Cr is halfway into the right lane, it broadcasts "maneuver complete."

Example Maneuver 2—Lane Merge Behind with 1 Car Assisting

In this example, cars C1 and C2 identify themselves as "cooperation capable" with known positions based on their Widesense™ models. C1 is situated in the right-hand lane of a one-way, two-lane highway. A non-Widesense™ car Cx is behind C1. The requesting car Cr is situated next to C1 in the left lane. In this maneuver:

1. Cr sends a plan that indicates a set of increased velocity waypoints for C1.
2. Cr's waypoints are a safety bounded merge to the right lane behind C1 with a decrease in speed. Waypoints are calculated with a minimum 1 second longitude space between cars before merge and a minimum 2 second longitudinal space between Cr and any car following C1 (e.g., merge criteria).
3. Cr's relaxation plan is a re-merge into the left lane.
4. Cr's safety time margin is 0.5 seconds silence from either peer, resulting in a maneuver abort.
5. C1 responds with an affirmative signal.
6. Cr executes the maneuver.
6. C1 speeds up.
7. Cx, behind C1, speeds up. The two-second longitudinal margin with Cx cannot be maintained.
8. Cr broadcasts "maneuver canceled."

Example Maneuver 3—Platoon Formation on Crowded Road

In this example, 4 cars identify themselves as "cooperation capable" with known positions based on their Widesense™ models. Three cars {C1, C2,C3} are situated in the right-hand lane of a one-way, two-lane highway. The requesting car Cr is situated next to C1, C2, and C3 in the left lane. In this maneuver:

1. C2 requests platooning with C1, C3, and Cr.
2. Cr declines the request.
3. C2 requests platooning with C1 and C3.
4. C2's waypoints indicate a 1-second longitudinal distance with C1 and C3 and a 0.2 second timeout.
5. C1, C2, and C3 tighten up to 1-second longitudinal distance.
6. A car in front of C1 slows down. C1 broadcasts breaking message (BSM). The platoon maintains a 1-second distance.
7. C1 broadcasts a predicted change in a traffic light ahead.
8. C2 requests new, speed-increased waypoints with a 1.5 second distance.
9. C1 and C3 agree.
10. C1, C2, and C3 speed up through the light.
11. C1 wants to turn right and announces to the platoon that it will leave the platoon.
12. C2 requests platooning with C3.

Figure 17:
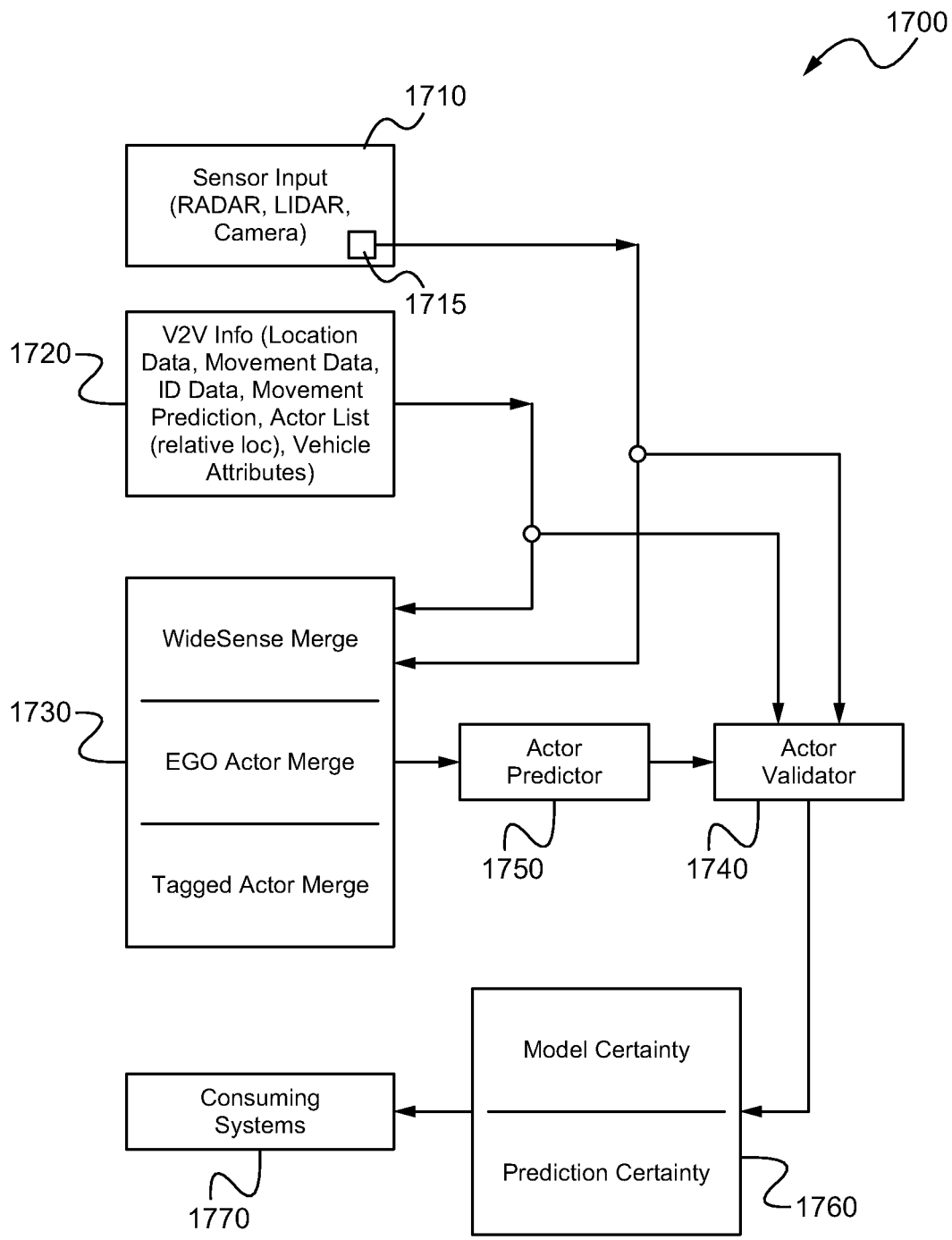
FIG. 17 is a block diagram of a system for coordinating actor movements in accordance with one embodiment of the invention.

FIG. 17 is a block diagram of a system 1700 in accordance with one embodiment of the invention. The system includes a Sensor Input 1710 that generates an Actor List 1715, which in turn is coupled to a Merge module 1730 and an Actor Validator 1740. A V2V (Vehicle-to-Vehicle) Information module 1720 is coupled to the Merge module 1730 and the Actor Validator module 1740. The Merge module 1730 is coupled to an Actor Predictor 1750, which is coupled to a Certainty module 1760, which is coupled to a Consuming System 1770. The V2V Information module 1720 includes location data, movement data, ID data, Movement prediction, an Actor list (relative locations), and Vehicle attributes. The Merge module 1730 includes a WideSense™ merge, an EGO actor merge, and a tagged actor merge. The Certainty module 1760 includes a model certainty and a prediction certainty.

The WideSense™ merged model combines multiple inputs from local (EGO) sensors, with shared actor lists from nearby entities. The output is an extended list of actors with locations and movement predictions. Each actor in the list is assigned a confidence percentage.

The Sensor module 1710 receives data from local sensors, primarily one or more of radar, LIDAR, and camera sensors, to name only a few sources. The sensors store local position, direction, and view angles. The Sensor module 1710 outputs a list of actors perceived by the EGO vehicle, including locations in either 2-dimensions or 3-dimensions. The Sensor module 1710 normalizes the output of the fused data to a standard actor location format.

The V2V Information module 1720 broadcasts information about an EGO vehicle and its local actor list to and from peers, such as other vehicles or static infrastructure. The broadcasted information includes the ID of the sender, the location of actors (including the orientation of the EGO vehicle), current movement of the actors, predicted movement of the actors, synchronized time of the data collection/estimation, vehicle attributes, such as mass, power, lateral capabilities, etc.

The WideSense™ merge module merges the local actor list with shared actor lists by:

1. Converting lists into a group of lists with a common reference frame.
2. Calculating the closest plausible overlap between shared list items.
    a. The search for plausible overlap will be bounded by rough locations and orientation of lists.
    b. The certainty of local actor analysis.
3. Calculating the uncertainty of the merged list combining uncertainty in the original lists and errors in the matched entities.

The Actor Predictor 1750 predicts the future movements of the merged actor list. This prediction is based on the observed behavior, the identified type, and the current movement of the actors.

The Actor Validator 1740 evaluates the next step behavior of each actor with the current observed behavior from the local sensor to evaluate the effectiveness of the model.

The Certainty module 1760 assigns a certainty to actor list assignments and observed data. The data is then passed to a planning, driver assist, or navigation system.

In some embodiments, the WideSense™ Merged model is deployed on high-capacity computing platforms on the sending vehicles or by a central/cloud system that merges models for individual EGO systems or groups of vehicles.

In some embodiments, merging is performed by using information from a fixed camera with a moving sensor, fusing the data on a multi-core machine, such as with an independent FM and Kalman filter, and using the information to inform a predicted trajectory, using a GPS system to update the likelihood, for example, of a collision.

In one embodiment, the shared prediction view (e.g., speed and predicted speed) is broadcast, such as in accordance with CAN cell phones. For example, vehicles can share their predicted speeds. In some embodiments, actors communicate directly with each other by radio, over 5-G networks, or through any suitable real-time communication device.

Though the examples above describe using autonomous vehicles, it will be appreciated that embodiments of the invention can be used in other environments. For example, the invention can be used in a warehouse environment where actors are robots that move inventory items. Embodiments of the invention are particularly useful in dynamic mixed-mode environments such as this, where people and inventory are constantly moving.

In one embodiment of the invention, a system predicts what a pedestrian might predict an actor will do, that is, which way the actor will go. For example, if a pedestrian with a mobile phone equipped with embodiments of the invention thinks that a car will not make a left turn, he can plan his actions accordingly. These "predictions of predictions" can also be shared among actors.

Some advantages of a product suite in accordance with embodiments of the invention follow:

WideSense™ Real Time Collection of Location Data
    Merged Model actor
    Real-time updates
    Combined Infrastructure and multi-car View
    Alternate route selection
Benefits
    Driver 360 degree awareness
    Improved Safety
    Increased Performance
WideSense™ Prediction
    Realtime prediction of actor behavior
    Robust prediction: vehicles, pedestrians, and bicycles
Benefits
    Safety
    Easier decisions
    Increased throughput at intersections
    City Data Service Movement Coordination
　Group information
　Maneuver requests
　Maneuvers, such as Eco platoon, unprotected left turns, and assisted merges
Benefits
　Autonomous vehicles avoid getting stuck in hard places
　Improved Safety
　AV acceptance
　AV performance
Coordinating Movements It will be appreciated that coordination of movements in accordance with embodiments of the invention can depend on the type of agents. Movement coordination for AVs, human-driven vehicles, and bicycles and scooters, for example, can include the following movements:

Autonomous Vehicles

For AVs, coordination includes:

1. At the behavioral level, "action primitives," such as lane changes, slowing down, speeding up, turning right or left, etc.
2. Path planning, such as changing the waypoints of a path.
3. Path following, such as changing acceleration or deceleration, braking, or steering.

Human-Driven Vehicles

Coordination for human-driven vehicles can have different forms, such as:

1. Suggesting changes in routing.
2. Suggesting behavior changes, such as suggesting motion primitives as lane changes, slowing down, speeding up, turning right or left, and merging.
3. Using vehicle driving assist systems to change speed, brake, and steer.

Bicycles/Scooters

Coordination for bicycles, scooters, and other non-motorized vehicles can also have different forms, such as:

1. Suggesting changes in routing.
2. Suggesting behavior changes, such as suggesting motions primitives like lane change, slow down, speed up, turn right or left, merge, etc.
3. Using actuation (if available) to change speed, brake, steer, etc.

These examples merely illustrate examples of coordinating movements. After reading this disclosure, those skilled in the art will recognize other forms of coordinating movements in accordance with the principles of the invention.

Model-Based Artificial Intelligence

Some embodiments of the invention employ a "model-based" artificial intelligence (AI), which, as used herein, refers to the ability of (1) building mixed physics-based and black-box (e.g., deep neural network) models by using data, (2) employing these models to make predictions and inferences, and (3) using predictions and inferences to compute control policies that respect physics constraints by using an Optimization/Machine Learning layer, such as the components 740, 840, and 1140B, in FIGS. 7, 8, and 11, respectively.

Model-based AI applications in accordance with the invention are able to be used on different levels of cars, including levels 0-5 (L0-L5). For example, as described above, a driver of an L0 car is able to receive messages on her cell phone, but is responsible for vehicle control. A driver of an L2 vehicle has less control, with the vehicle using knowledge of the driving environment to automate such features as steering, acceleration/deceleration, etc. Embodiments are able to be deployed on low-latency networks, such as 4G and 5G networks. Embodiments are also able to be deployed for use on V2V (vehicle-to-vehicle), V2D (vehicle-to-device), V2I (vehicle-to-infrastructure), and V2X (communication between a vehicle and all traffic elements) systems, to name only a few examples.

In accordance with some embodiments, model-based AI can be deployed in two architectures, Cloud-to-Vehicle and Vehicle-to-Vehicle. Cloud-to-Vehicle architecture is best suited for 4G vehicle connectivity, while the Vehicle-to-Vehicle architecture requires a low-latency communications fabric such as 5G/C-V2X or DSRC point-to-point communications. After reading this disclosure, those skilled in the art will recognize that the invention can be adapted for other architectures.

In accordance with the principles of the invention, numerous applications can be enabled with the deployment of Model-based AI in the cloud and in vehicles. Some examples include: a) For L2 vehicles with 4G connectivity—improving the range and lowering the energy costs for Plug-in Hybrids and EVs by combining vehicle models and driver behavior models with route topography, traffic data, and on-route energy costs with real-time optimization to compute the most energy efficient and least-cost route between an origination and destination point. b) For L2+ vehicles with 5G/C-V2X or DSRC communications, allowing for applications like automated vehicle coordination to execute complex maneuvers like lane merge, unprotected left turn, and dynamic platoon formation and release. These real-time automated complex maneuvers become even more important as Autonomous Vehicles (AV) are deployed in mixed traffic scenarios as well as in geo-fenced scenarios like robo-taxis and shuttles.

In operation, a vehicle captures image and location information of objects in a scene, receives similar information from agents in the area, and fuses this information to generate a general view of the scene. Information from this general view is reduced, to make storage and processing more efficient, by filtering out irrelevant data, such as those about static objects. The movements about the remaining objects are predicted. These predicted movements are used to determine the vehicle's own movement, to reduce the risk of collision, increase energy efficiency, form platoons to increase traffic flow, merge efficiently, and receive travel suggestions, to name a few goals. The vehicle is then maneuvered by sending commands to its steering mechanism and powertrain. During the maneuver, communications with other similarly configured vehicles in the area are monitored to ensure safe operation. If communication is lost, abortive or other maneuvers are taken.

Similar goals can be achieved in robotic and other environments.

It will be readily apparent to one skilled in the art that various other modifications may be made to the embodiments without departing from the spirit and scope of the invention as defined by the appended claims.

We claim:

1. A method of controlling movements of a first actor, the method comprising:
　collecting one or more first sets of location information from sources comprising a first actor, a second actor, and a fixed sensor, each set indicating a current location of an object from one or more objects within a scene;
　fusing the first sets of location information to generate a second set of current location information of the one or more objects within the scene;
　filtering the second set of current location information to remove location information of any static objects to generate a subset of the current location information for a subset of the one or more objects;

determining, for each object in the subset of the one or more objects, a predicted trajectory, the predicted trajectory corresponding to a probability trajectory having a highest probability among one or more probability trajectories for historical objects at the object's location within the scene at a historical time instance, the one or more probability trajectories determined from historical data collected over a period of time, the historical time instance comprising one or more of an hour of a day, a day of a week, a day of a month, a time of a year, and a day of a year which corresponds to a same one or more of a current hour of the day, day of the week, day of the month, time of the year, and day of the year; and controlling movements of the first actor based on the one or more predicted trajectories to optimize one or more pre-determined movement criteria.

2. The method of claim 1, wherein the fusing comprises filtering non-relevant information from the second set of current location information.

3. The method of claim 1, wherein the movements comprise merging into an intersection, merging into moving traffic, or merging into a platoon of moving vehicles.

4. The method of claim 1, wherein the first actor comprises an autonomous vehicle.

5. The method of claim 4, wherein the autonomous vehicle comprises a camera, a radar, a processor, and a transceiver for communicating with the remaining sources.

6. The method of claim 5, wherein the processor is a multi-core processor having multiple cores, wherein the multiple cores process location information from the subset of current location information in parallel with each other.

7. The method of claim 1, wherein the first actor comprises a robot or a mobile telephone.

8. The method of claim 1, wherein the subset of objects comprises a non-autonomous motorized vehicle, a non-motorized vehicle, a pedestrian, or any combination thereof.

9. The method of claim 1, wherein the one or more pre-determined movement criteria comprise collision avoidance, merging based on merge restrictions, decreased total energy consumption of the first actor over a pre-determined time or distance, reduced traffic density in a pre-determined region, or any combination thereof.

10. The method of claim 9, wherein the one or more pre-determined movement criteria comprise merging based on merge restrictions, the merge restrictions comprise acceleration or deceleration with a predetermined range.

11. The method of claim 1, wherein the scene is a fixed location or a location relative to one or more moving objects.

12. The method of claim 1, wherein each of the probability trajectories includes a safe set that ensures collision avoidance by maintaining, for each object in the subset of the one or more objects, at least an associated time-interval separation between the object and the first actor.

13. The method of claim 12, wherein each of the safe sets has an acknowledgment window during which the first actor must receive communications from a pre-determined set of actors.

14. The method of claim 13, further comprising the first actor taking an evasive maneuver when the first actor does not receive the communications from the pre-determined set of actors within the acknowledgment window.

15. The method of claim 12, wherein each of the safe sets has parameters based on a motion of a corresponding actor and a scene containing the corresponding actor.

16. The method of claim 12, wherein each of the safe sets forms a geometric shape.

17. The method of claim 1, wherein the first actor wirelessly communicates directly with the second actor.

18. The method of claim 1, wherein the first actor wirelessly communicates with the second actor over a cloud network.

19. The method of claim 1, wherein the first actor and the second actor exchange prediction information indicating the probability trajectories for objects within the scene.

20. A method of controlling movements of a first actor, the method comprising:

merging location data from a first actor and one or more sources for one or more current objects within a scene;

determining, for each of the one or more current objects, a predicted trajectory based on a location of the current object within the scene and a current time instance, wherein the predicted trajectory is determined from historical trajectory data collected over a period of time for historical objects at the location at a historical time instance that corresponds to a same current time instance comprising one or more of an hour of a day, a day of a week, a day of a month, a time of a year, and a day of a year; and moving the first actor within the scene based on the one or more predicted trajectories.

21. The method of claim 20, wherein the one or more sources comprise a second actor, a fixed sensor, or both.

22. The method of claim 21, further comprising exchanging, between the first and second actors, predictions about movements of objects within the scene.

23. The method of claim 20, wherein the first actor comprises an autonomous vehicle, a robot, or a mobile telephone.

24. The method of claim 23, wherein the scene comprises a road.

25. The method of claim 20, wherein moving the first actor is based on a map containing the scene, a context for the first actor, and processed location data, the context comprising a location of the first actor within the scene and a time instance.

26. The method of claim 25, wherein the context for the first actor further comprises speeds of the one or more objects within the scene, a time of day, a day of the week, a holiday status, a location of the scene relative to a traffic exit, physics-based principles describing movement of at least one of the one or more objects, or any combination thereof.

27. The method of claim 20, wherein predicted trajectories are determined only for non-static objects within the scene.

28. The method of claim 20, wherein moving the first actor comprises moving into an intersection, merging into moving traffic, or merging into a platoon of moving vehicles.

29. The method of claim 20, wherein moving the first actor comprises optimizing collision avoidance, merging based on merge restrictions, decreasing total energy consumption of the first actor over a pre-determined time or distance, reducing traffic density in a pre-determined region, or any combination thereof.

30. The method of claim 20, wherein moving the first actor comprises transmitting commands to steer, accelerate, or decelerate the first actor.

31. The method of claim 20, wherein for each of the one or more current objects, a predicted trajectory for a historical object at location and historical time instance corresponds to a historically most frequent trajectory for historical objects at the location and the historical time instance observed over time.

32. A system for controlling movements of an actor, the system comprising:

a sensor comprising a processor, the sensor configured to merge location data from one or more sources about one or more current objects within a current scene;

a predictive model module comprising computer-executable instructions that when executed by the processor determines, for each of the one or more current objects, a predicted trajectory based on a location of the current object within the scene and a current time instance, wherein the predicted trajectory is determined from historical trajectory data collected over a period of time for historical objects at the location at a historical time instance that corresponds to a same current time instance comprising one or more of an hour of a day, a day of a week, a day of a month, a time of a year, and a day of a year; and a motion control unit configured to control movements of the actor based on the one or more predicted trajectories to optimize one or more pre-determined movement criteria.

33. The system of claim 32, wherein the one or more pre-determined movement criteria comprise collision avoidance, merging based on merge restrictions, decreased total energy consumption of the actor over a pre-determined time or distance, reduced traffic density in a pre-determined region, or any combination thereof.

34. The system of claim 32, further comprising a filter for filtering out static objects within the scene to determine the one or more objects.

35. The system of claim 32, wherein the actor comprises the predictive model module.

36. The system of claim 32, wherein the actor is coupled to the predictive model module over a cloud network.

37. The system of claim 32, further comprising a model learning module comprising computer-executable instructions for updating the predictive model module based on historical movements of multiple objects within the scene.

38. The method of claim 32, wherein for each of the one or more current objects, a predicted trajectory for a historical object at a location and time instance corresponds to a historically most frequent trajectory for historical objects at the location and the historical time instance observed over time.

* * * * *